US012509654B2

(12) United States Patent
Parziale et al.

(10) Patent No.: US 12,509,654 B2
(45) Date of Patent: Dec. 30, 2025

(54) BIOPROCESSING SYSTEM AND CONSUMABLE BAG FOR A BIOPROCESSING SYSTEM

(71) Applicant: GLOBAL LIFE SCIENCES SOLUTIONS USA LLC, Marlborough, MA (US)

(72) Inventors: Michelle Parziale, Marlborough, MA (US); Hanna-Leena Saukkonen, Boston, MA (US); Michael Miller, Shrewsbury, MA (US); Christopher Dunn, Longmeadow, MA (US); Kenneth Mellace, Abington, MA (US); Elizabeth Stegner, Rye, NH (US); Ralph Stankowski, Westborough, MA (US); Ian Darisse, Southborough, MA (US); Keith Benoit, Grafton, MA (US)

(73) Assignee: GLOBAL LIFE SCIENCES SOLUTIONS USA LLC, Marlborough, MA (US)

( * ) Notice: Subject to any disclaimer, the term of this patent is extended or adjusted under 35 U.S.C. 154(b) by 782 days.

(21) Appl. No.: 17/607,105

(22) PCT Filed: Apr. 29, 2020

(86) PCT No.: PCT/EP2020/061862
§ 371 (c)(1),
(2) Date: Oct. 28, 2021

(87) PCT Pub. No.: WO2020/221794
PCT Pub. Date: Nov. 5, 2020

(65) Prior Publication Data
US 2022/0213420 A1 Jul. 7, 2022

Related U.S. Application Data

(60) Provisional application No. 62/841,888, filed on May 2, 2019.

(51) Int. Cl.
*C12M 1/00* (2006.01)
*C12M 1/36* (2006.01)
(Continued)

(52) U.S. Cl.
CPC ............ *C12M 23/14* (2013.01); *C12M 23/28* (2013.01); *C12M 23/38* (2013.01); *C12M 23/40* (2013.01);
(Continued)

(58) Field of Classification Search
CPC ...... C12M 23/14; C12M 27/16; C12M 29/04; C12M 23/26; C12M 23/28; C12M 23/48;
(Continued)

(56) References Cited

U.S. PATENT DOCUMENTS

2005/0272146 A1* 12/2005 Hodge .................. B01F 35/513
435/289.1
2013/0157355 A1 6/2013 Barrett et al.
(Continued)

FOREIGN PATENT DOCUMENTS

CN 104640973 5/2015
CN 106 566 772 4/2017

OTHER PUBLICATIONS

GE Healthcare Bio-Sciences AB, ReadyToProcess WAVE 25 Operating Instructions 29009597 AD, First published Jun. 2013. (Year: 2013).*

(Continued)

*Primary Examiner* — Dean Kwak
(74) *Attorney, Agent, or Firm* — Grogan, Tuccillo & Vanderleeden LLP

(57) ABSTRACT

A bioreactor system, includes a base platform, a lid received atop the base platform and defining an interior space for receiving a bioprocessing bag, and a tubing management system supporting a tubing array a distance above the base (Continued)

platform and providing a means for quickly connecting and/or disconnecting a fluid supply line.

7 Claims, 28 Drawing Sheets

(51) Int. Cl.
*C12M 3/00* (2006.01)
*G06K 19/077* (2006.01)

(52) U.S. Cl.
CPC ............ *C12M 23/42* (2013.01); *C12M 23/48* (2013.01); *C12M 29/04* (2013.01); *C12M 29/10* (2013.01); *C12M 29/20* (2013.01); *C12M 41/48* (2013.01); *G06K 19/07758* (2013.01)

(58) Field of Classification Search
CPC ...... C12M 23/08; C12M 23/38; C12M 23/46; C12M 25/02; C12M 25/06; C12M 23/22; C12M 23/24; C12M 23/34; C12M 29/10; C12M 29/14; C12M 29/18; C12M 29/26; C12M 33/00; C12M 41/46; C12M 41/48; C12M 23/04; C12M 23/12; C12M 23/40; C12M 23/42; C12M 23/50; C12M 23/52; C12M 25/16; C12M 27/20; C12M 29/06; C12M 29/08; C12M 29/20; C12M 3/00; C12M 33/22; C12M 35/00; C12M 35/06; C12M 37/04; C12M 41/12; C12M 41/14; C12M 41/18; G06K 19/07758; B01L 2200/0689; B01L 2200/026; B01L 2200/082; B01L 2200/18; B01L 2300/043; B01L 2300/0681; B01L 2300/126; B01L 3/502; B01L 3/5055; B01L 2300/049; B01L 2300/0832; B01L 2300/1894; B01L 2400/0487; B01L 2400/0638; B01L 3/50; B01L 3/508; B01L 3/563; B01F 31/20; B01F 31/23; B01F 35/513; B01F 23/23121; B01F 23/231265; B01F 23/23365; B01F 27/808; A61M 2207/10; A61M 2039/087; A61M 39/08; A61M 39/12

See application file for complete search history.

(56) References Cited

U.S. PATENT DOCUMENTS

| | | |
|---|---|---|
| 2018/0002655 A1 | 1/2018 | Patil et al. |
| 2018/0251715 A1 | 9/2018 | Paul et al. |
| 2018/0371399 A1 | 12/2018 | Griffin et al. |
| 2019/0048303 A1* | 2/2019 | Maggiore ............ B67D 3/0012 |

OTHER PUBLICATIONS

English translation of Chinese Office Action dated Jun. 26, 2023 for corresponding Chinese Application No. 202080032746.4.
International Search Report Issued in Corresponding PCT Application No. PCT/EP2020/061862 Dated Oct. 26, 2020.

* cited by examiner a)

b)

c)

BIOPROCESSING SYSTEM AND CONSUMABLE BAG FOR A BIOPROCESSING SYSTEM

CROSS REFERENCE TO RELATED APPLICATIONS

This application is a national stage of International Application No. PCT/EP2020/061862 filed on Apr. 29, 2020, which claims priority to U.S. Provisional Patent Application No. 62/841,888 filed on May 2, 2019, all of which are hereby incorporated by reference in their entireties.

BACKGROUND

Technical Field

Embodiments of the invention relate generally to bioprocessing systems and methods, and components, and, more particularly, to improvements in bioreactor systems.

Discussion of Art

A commonly used type of bioreactor for cultivating cells is provided on a rocker unit, e.g. the WAVE™ bioreactor (GE Healthcare). Mixing of the culture is accomplished by the wave-induced agitation which is performed by the rocker unit. The conditions in the cell culture can be regulated by different means, for example the temperature can be regulated by providing heat, pH can be regulated by adding acid or base and the amount of liquid/media added or removed can be controlled. One or more bioreactor bags are provided on the rocker unit and connected to various fluid flow lines for the addition or removal of fluids and gases.

While existing rocker-type bioreactor systems are generally suited for what is regarded as ordinary performance, there is a need for improvements in terms of ease and convenience of use, tubing management, filtering and the like. For example, tubing on existing bioreactor systems for air supply can become cumbersome and kinked. In addition, inlet and outlet ports are typically associated with non-integrated vent filters which are costly and provide a lot of variability from system to system.

Accordingly, there is a need for a rocker-type bioreactor system and disposable bag therefore that minimizes or addresses the drawbacks of existing systems and devices.

BRIEF DESCRIPTION

In one aspect, the invention discloses a bioreactor system including a base platform, a lid received atop the base platform and defining an interior space for receiving a bioprocessing bag/bioreactor bag, and a tubing management system supporting a tubing array a distance above the base platform and providing a means for quickly connector and/or disconnecting a fluid supply line.

In a second aspect, the present invention provides a vent filter with a superhydrophobic membrane to allow minimized stand-off separation from the bioreactor bag and reduce condensation and fouling.

DRAWINGS

The present invention will be better understood from reading the following description of non-limiting embodiments, with reference to the attached drawings, wherein below:

DETAILED DESCRIPTION

Figure 1:
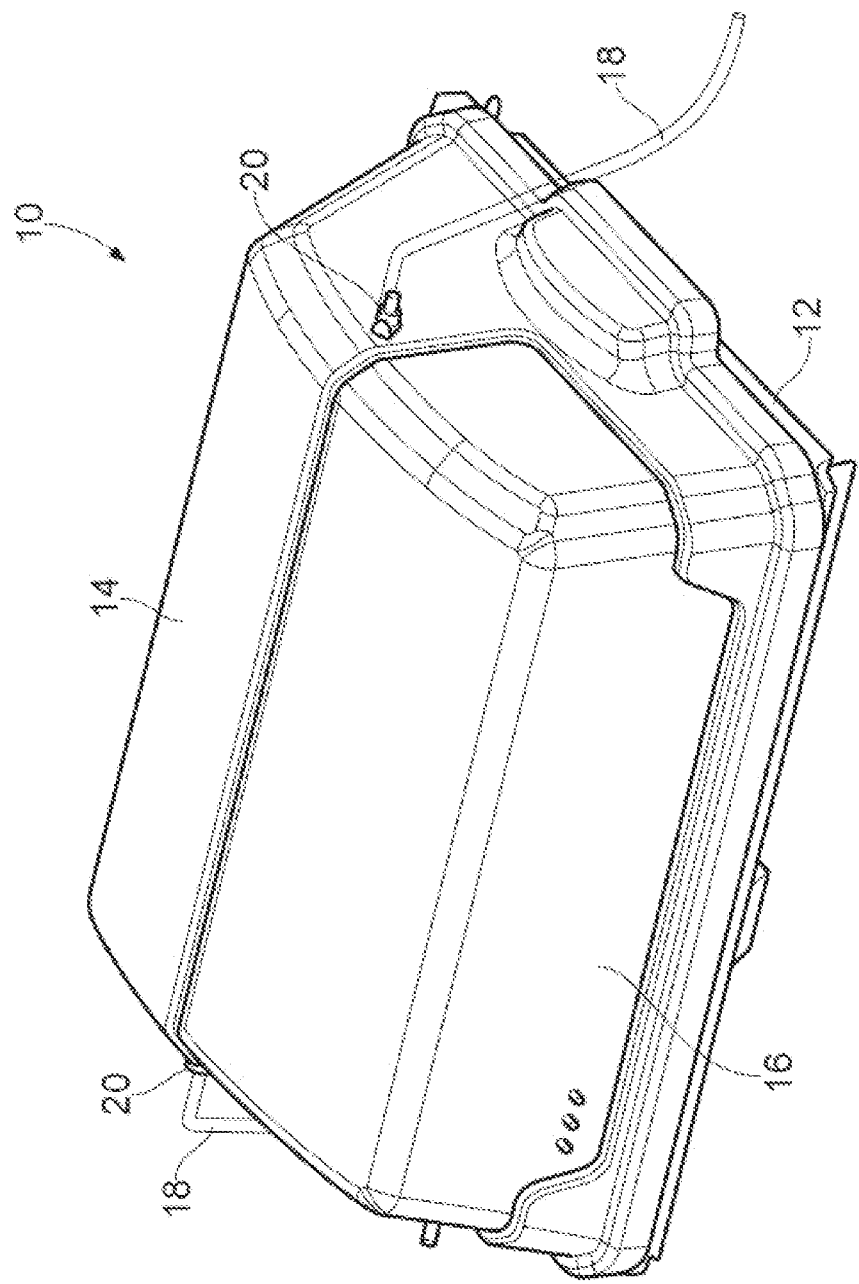
FIGS. 1-11 are various views of a bioreactor system according to an embodiment of the invention.

Reference will be made below in detail to exemplary embodiments of the invention, examples of which are illustrated in the accompanying drawings. Wherever possible, the same reference characters used throughout the drawings refer to the same or like parts.

Embodiments of the invention provide bioreactor or bioprocessing systems. In an embodiment, a bioreactor system includes a base platform, a lid received atop the base platform and defining an interior space for receiving a bioprocessing/bioreactor bag, and a tubing management system supporting a tubing array a distance above the base platform and providing a means for quickly connector and/or disconnecting a fluid supply line.

With reference to FIG. 1, a bioreactor system 10 according to an embodiment of the invention is illustrated. The bioreactor system 10 is generally configured similar to existing rocking-type bioreactor systems known in the art such as, for example, the WAVE™ line of bioreactor systems/platforms (GE Healthcare Life Sciences), and includes a generally rectangular platform or base 12 and a lid 14 received atop the base and defining an interior space therebetween. The lid 14 includes a front panel or door 16 that provides selective access to the interior space without entirely removing the lid 14. In an embodiment, the lid 14 may be formed from a semi-transparent, UV-blocking material and/or may include a window made out of a semi-transparent, UV-blocking material that allows a user to see into the interior space.

Figure 2:
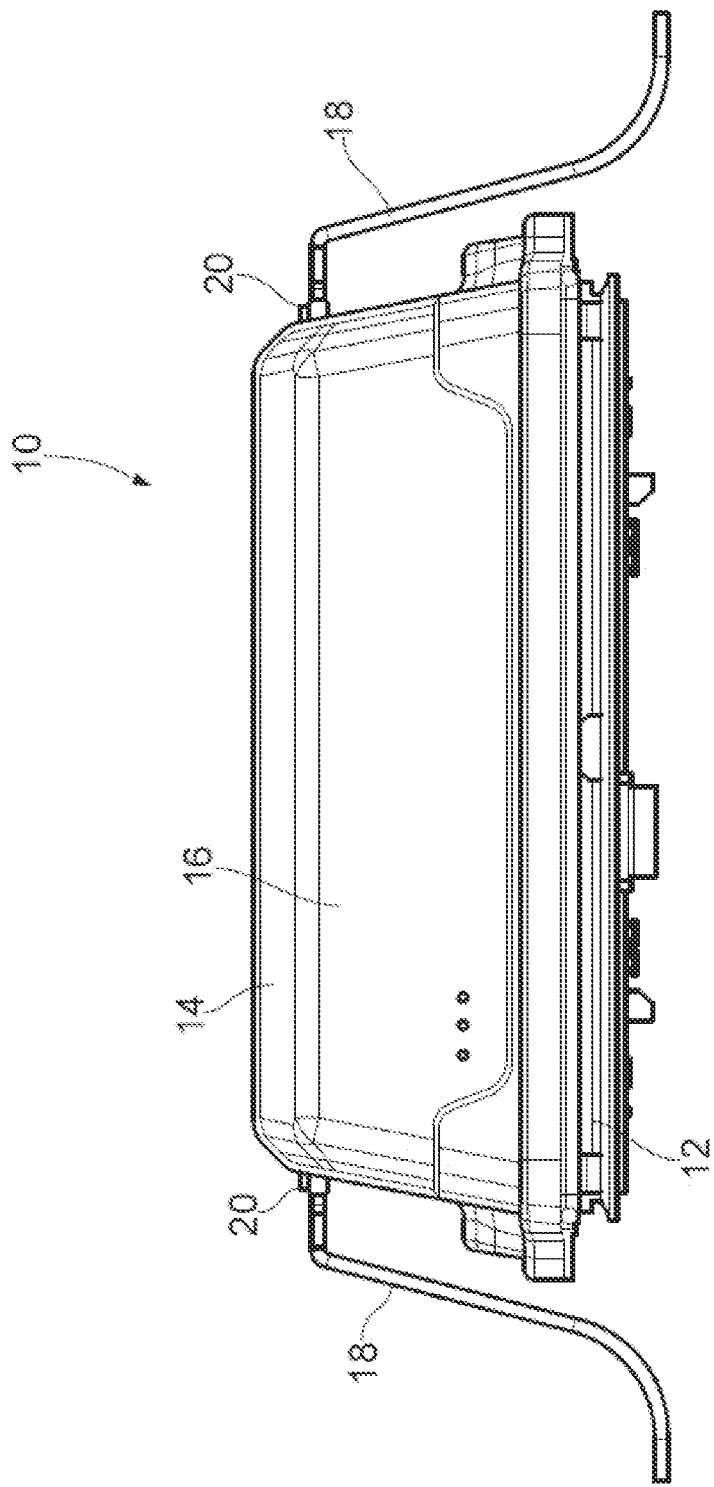
Figure 3:
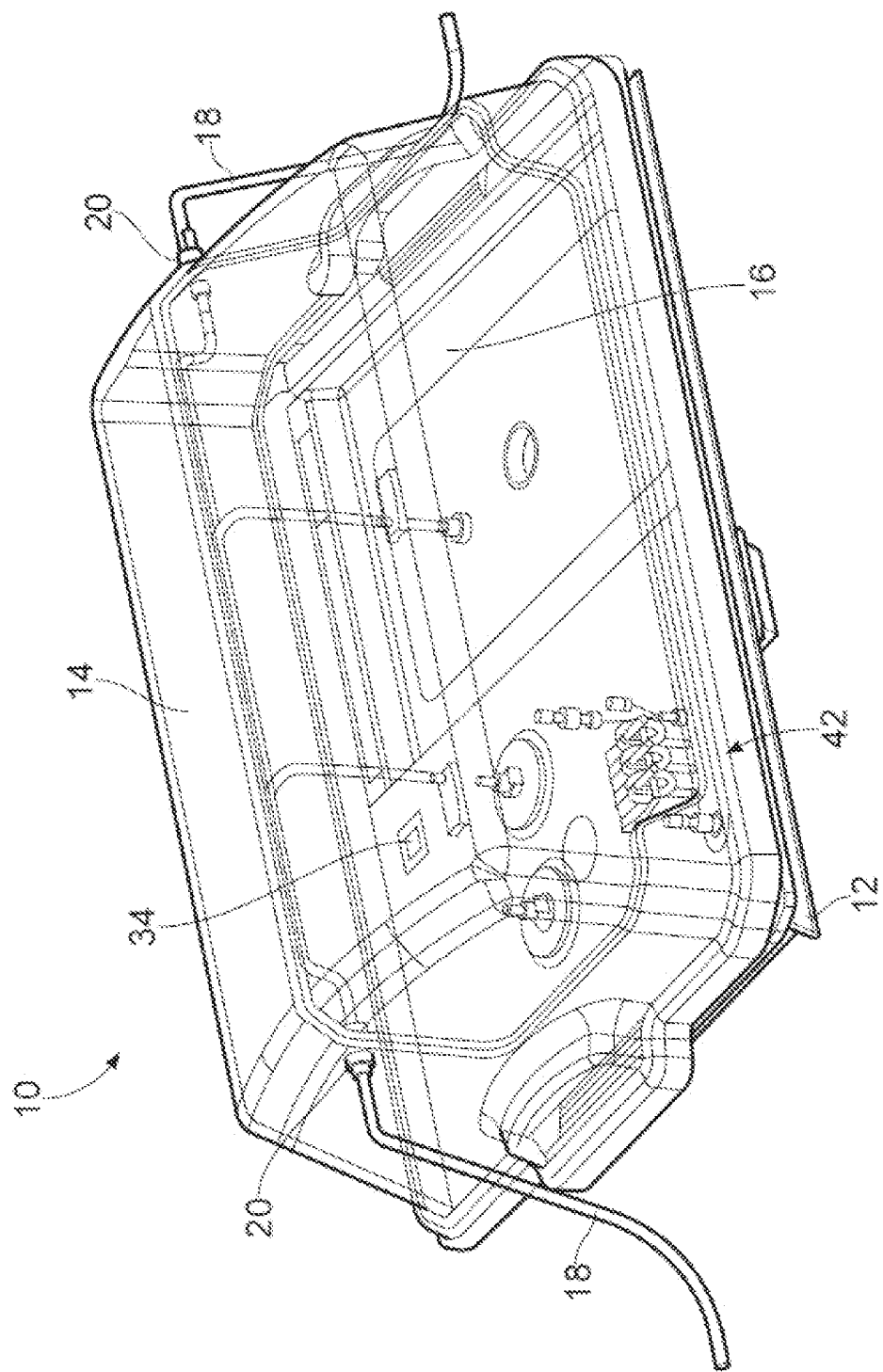
Figure 4:
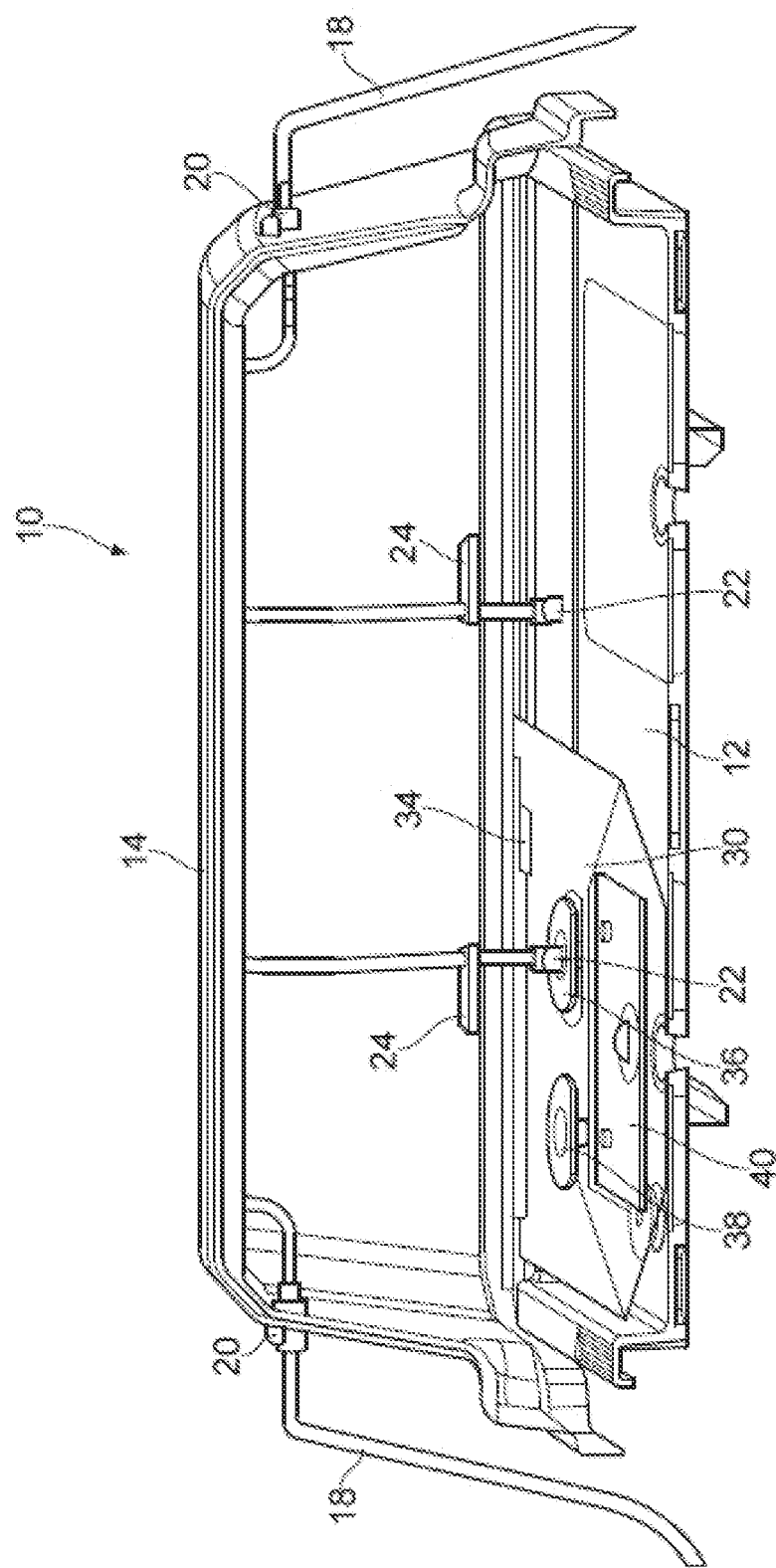
Figure 5:
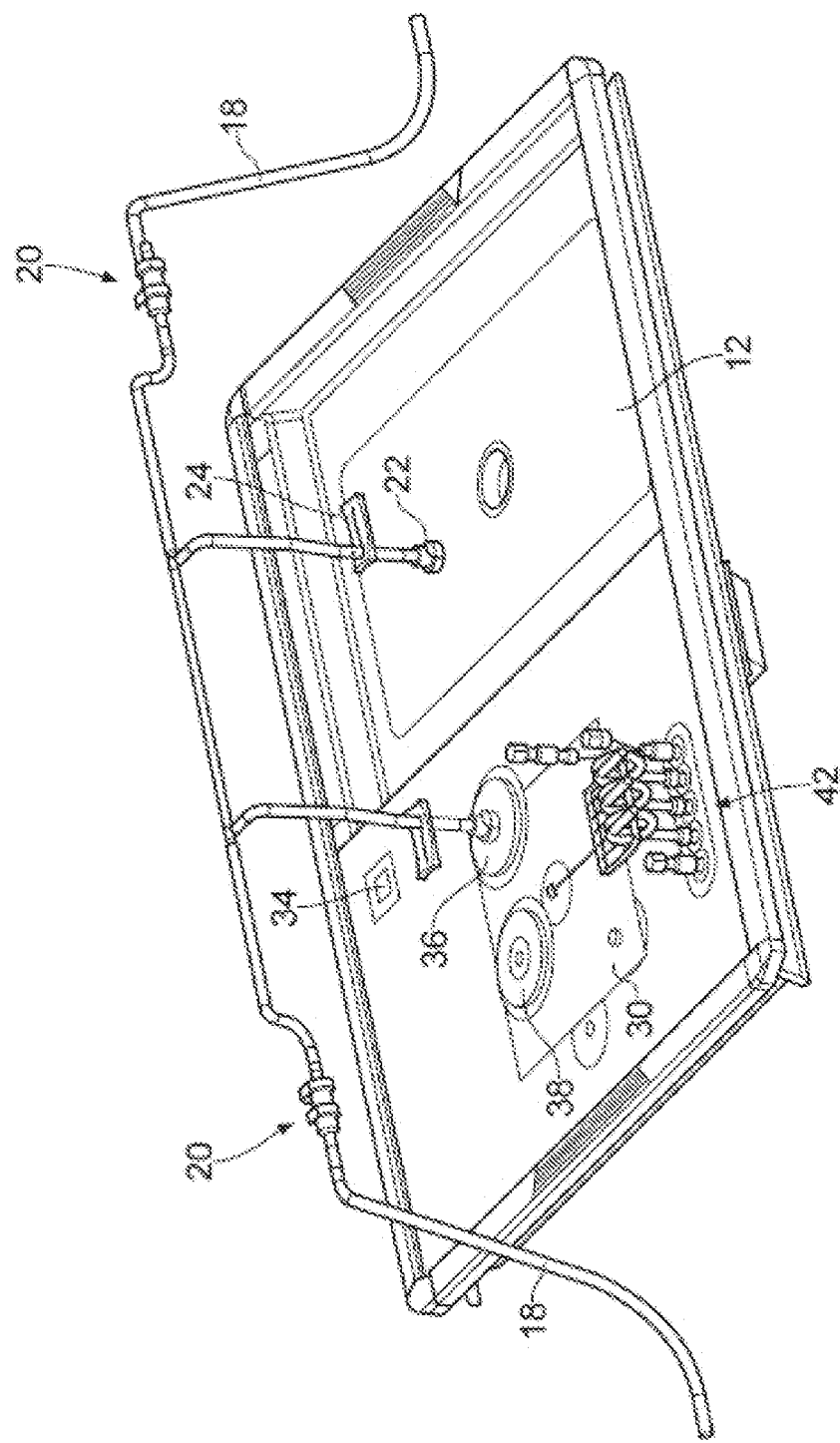

The bioreactor system 10 also includes a tubing management system which will be hereinafter described. As shown in FIGS. 1 and 2, for example, tubing 18 is attached to the lid 14 adjacent to a top thereof using connect/disconnects 20. As best shown in FIG. 4, inlets 22 on both sides of the bioreactor 10 allow for user setup of pumps and air supply on either side of the system 10. As also shown therein, the tubing 18 interior of the system 10 hangs from the top of the system and has a connect/disconnect device 22 at the distal end thereof for selective coupling with a single-use bioprocessing/bioreactor bag 30. Clamps 24 allow for a supply of air to be sent to one, both, or opposite bioprocessing/bioreactor bags 30 (the system shown in the figures is capable of accommodating two bioprocessing bags arranged side by side; one such bag 30 is shown in the figures). The clamps have an aperture and a slot that allows the clamps 24 to be moved between a position where fluid within the tubing is permitted to pass by the clamp, and a position where fluid is prevented from passing by the clamp.

Figure 6:
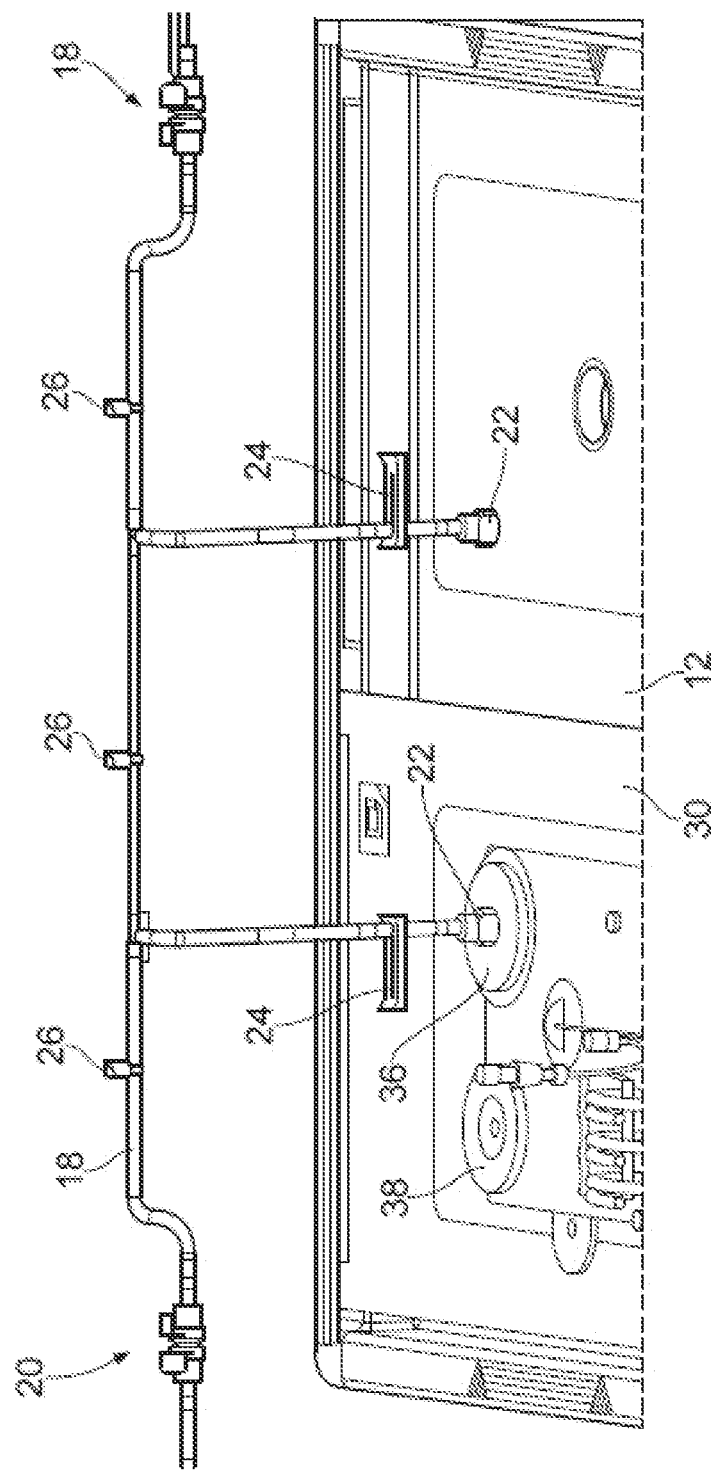
Figure 7:
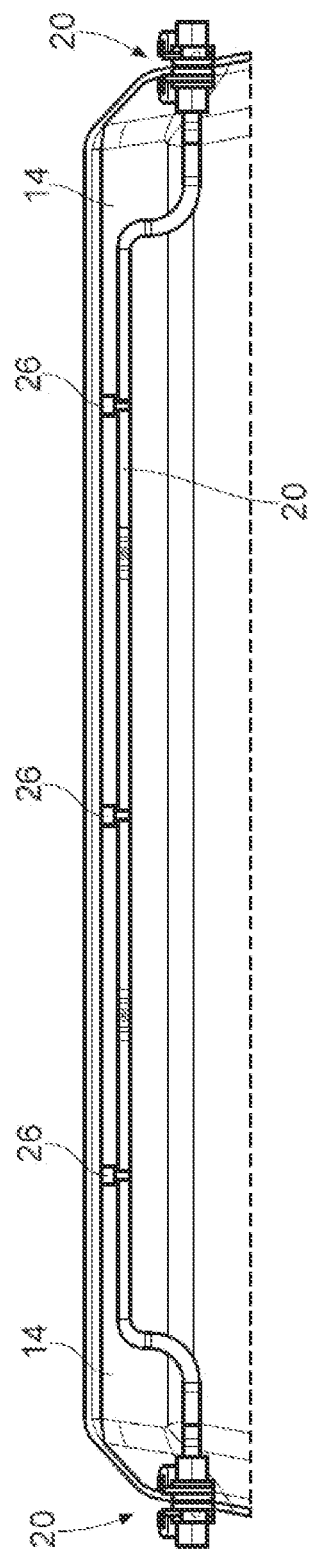

With reference to FIGS. 6 and 7, in an embodiment, clips 26 are utilized to connect and hold the tubing 18 within the interior space/chamber to the underside of the lid 14. The clips 26 are secured to the underside of the rear portion of the lid (i.e., rearward of the door 16, which enables the door 16 to be selectively opened, as discussed below.

Figure 8:
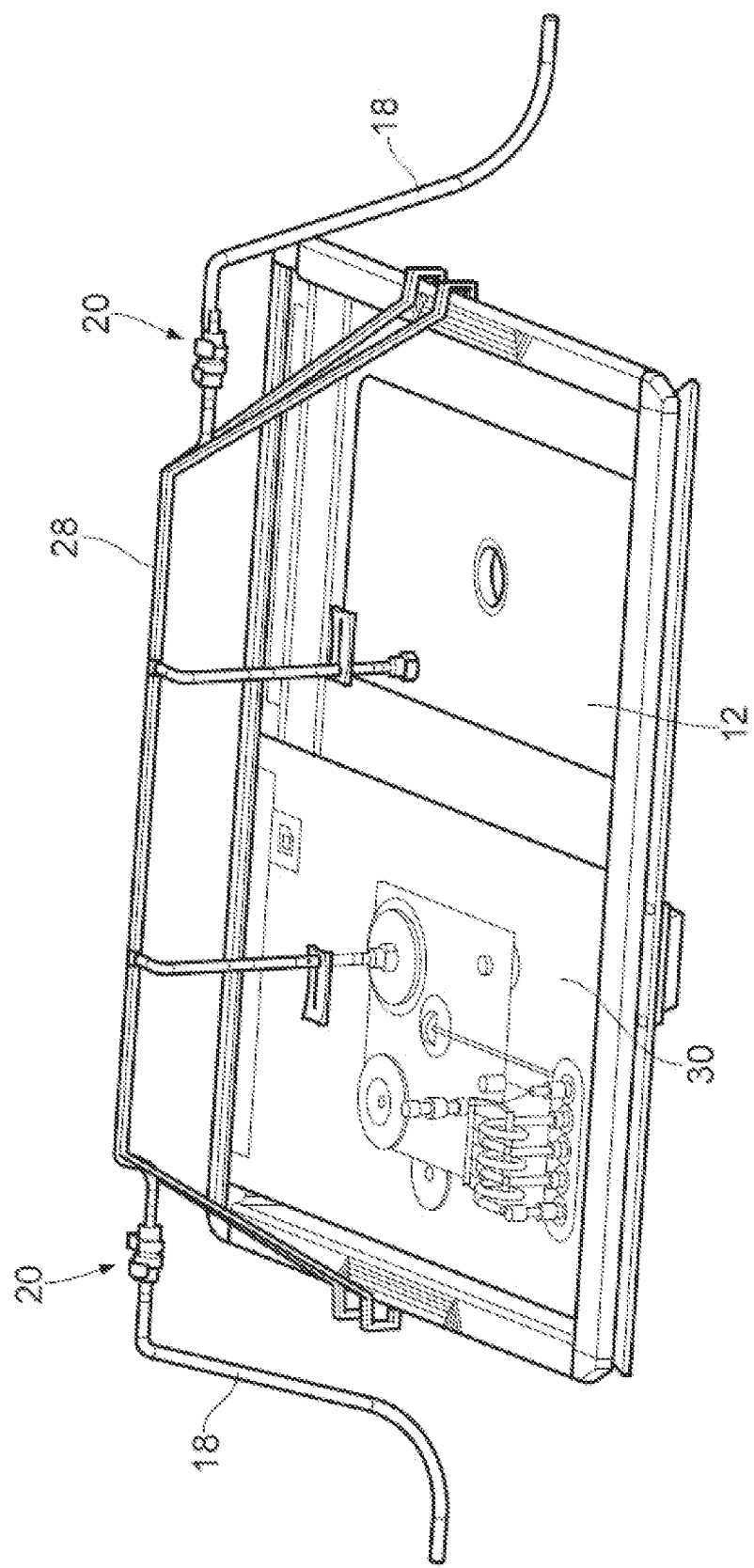
Figure 9:
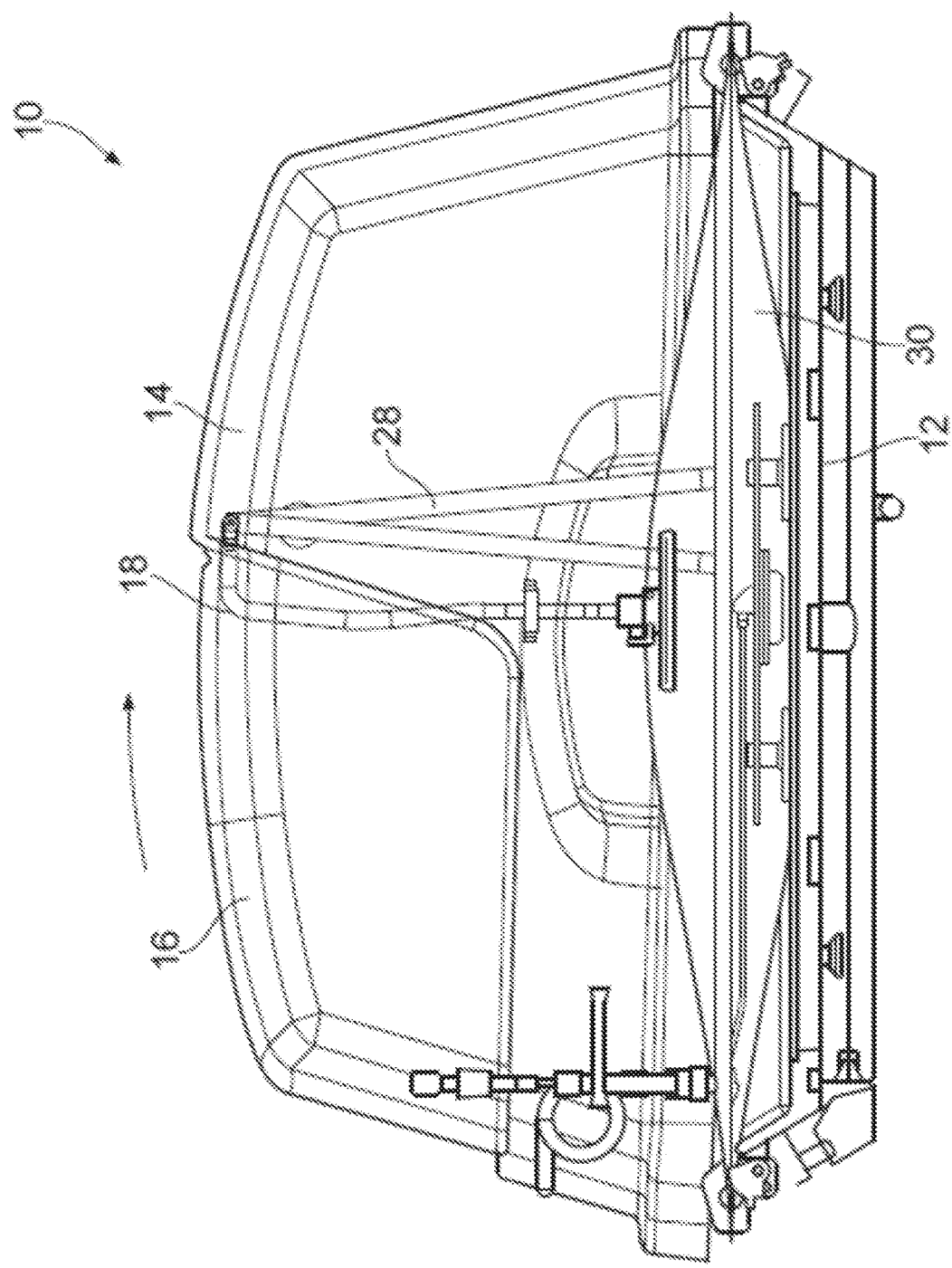
Figure 10:
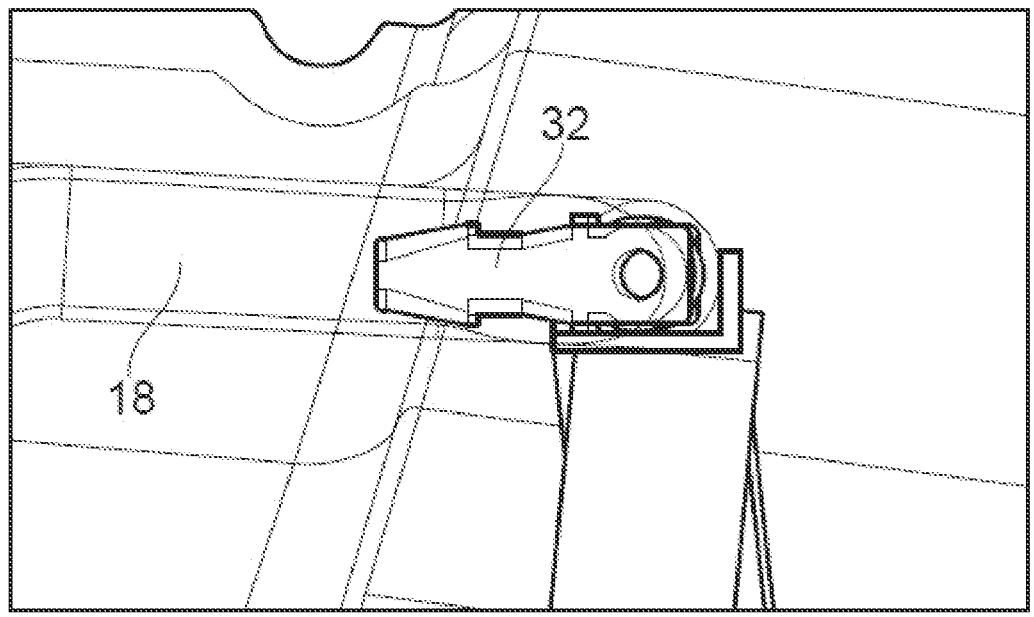
Figure 11:
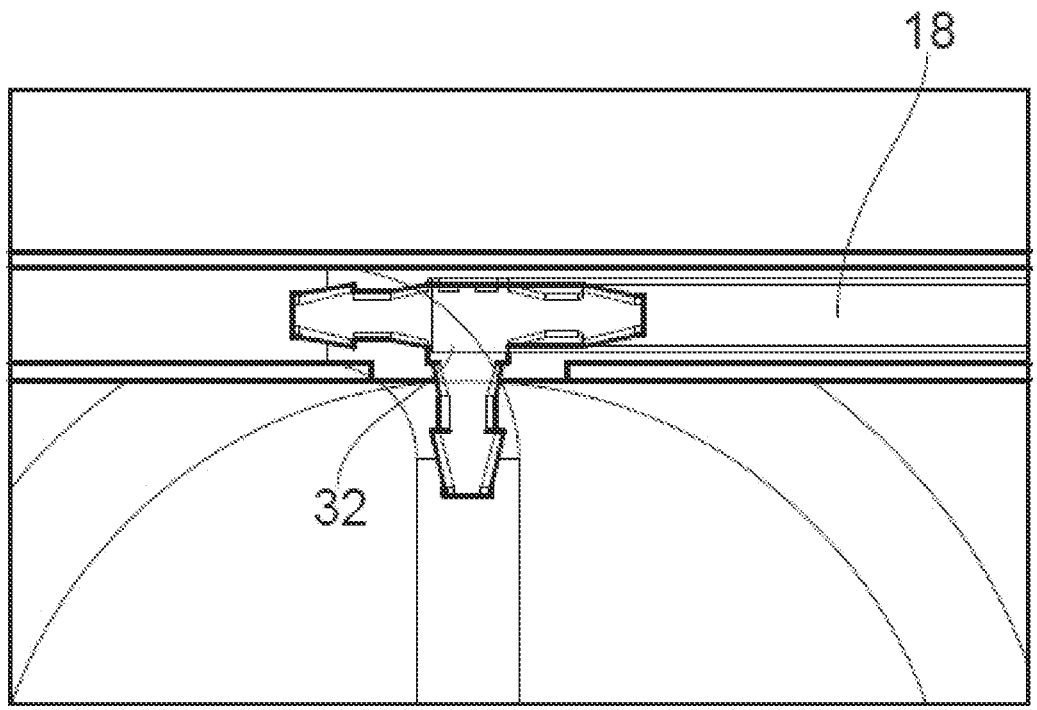

Turning now to FIG. 8, in one embodiment, scaffolding or a gantry-like structure 28 may be utilized to support the tubing 18 above the platform 12 (i.e., without the use of the lid 14 to support the tubing 18). This allows the lid to be removed entirely during bioprocessing, enabling more unobstructed access and viewing of the bioprocessing bag 30. With reference to FIG. 9, the scaffolding 28 beneath the lid 14 allows for the door 16 to be opened (e.g., by rotating it rearward beneath the rearward portion of the lid 14). As shown in FIGS. 10 and 11, tubing 18 and T-connects 32 fit smoothly into the scaffolding 28 and can be removed/changed out, if needed.

With specific reference to FIGS. 3-6, the bioprocessing bag 30 may include a RFID chip or label 34 that may be passive or active. The RFID label can be read to provide information on the bag type, lot number, manufacture date, etc. The presence of the RFID device 34 facilitates real-time insight into the location of every consumable from manufacture to consumption, and can be used in better inventory management.

As also shown therein, the bioprocessing bag 30 includes a first vent filter 36 of the present invention. The present invention contemplates that the vent filter of the present invention is a stand-alone invention suitable for other bioprocessing applications and/or single-use bioreactors. The vent filters of the present invention can act as both inlets (for adding air, oxygen, etc.) and outlets (to vent waste) while retaining sterility in the bio reactor bag. Additional vent filters may be provided as back-ups in the event the vent filters vapor lock or foul. It is contemplated that the vent filter can include a check valve which may be integral to this assembly and would be desirable for proximity and cost reduction.

Figure 12:
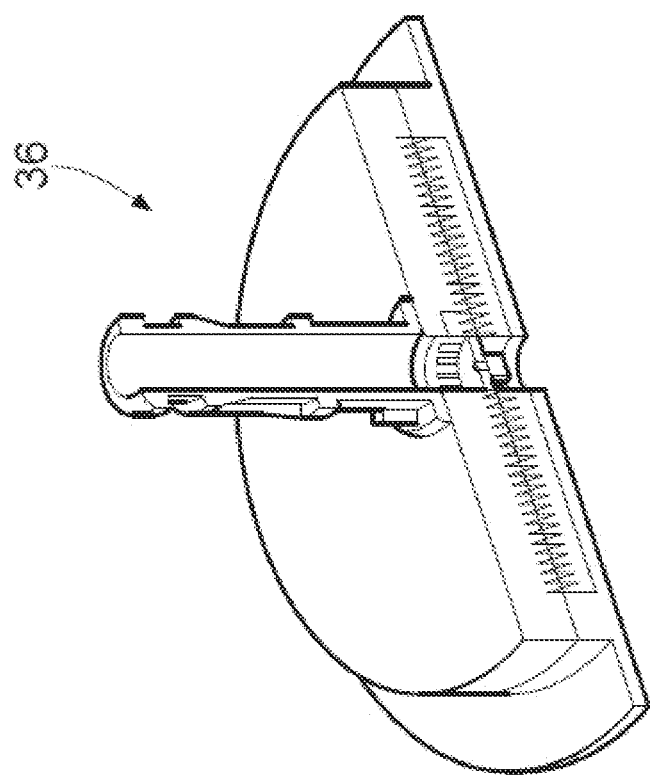
FIGS. 12 and 13 are perspective views of inlet and outlet vent filters of a bioprocessing bag of the bioreactor system of FIGS. 1-11.
Figure 13:
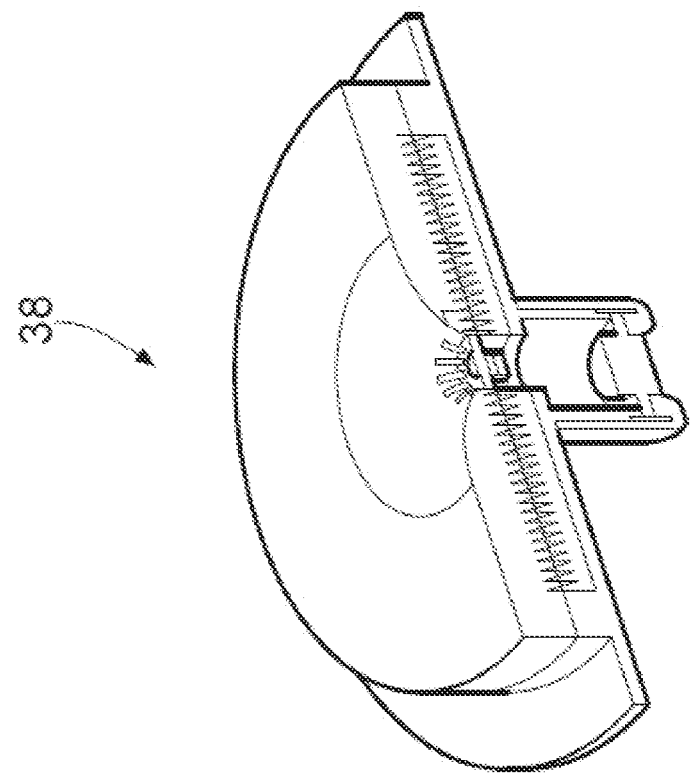

Vent filter 36 includes an integrated inlet port and check valve and a second vent filter 38 having an integrated outlet port and check valve. The bag 30 also includes a perfusion filter 40 positioned interior to the bag 30 and a tubing management apparatus 42 connected to the bag and extending upwardly from an upper surface of the bag. The vent filters 36, 38, by being integrated with the bag 30, itself, obviate the need for filter heaters and include a quick-connect means for attaching inlet or outlet tubing. FIGS. 12 and 13 provide more detailed views of the vent filters 36, 38, respectively.

Figure 14:
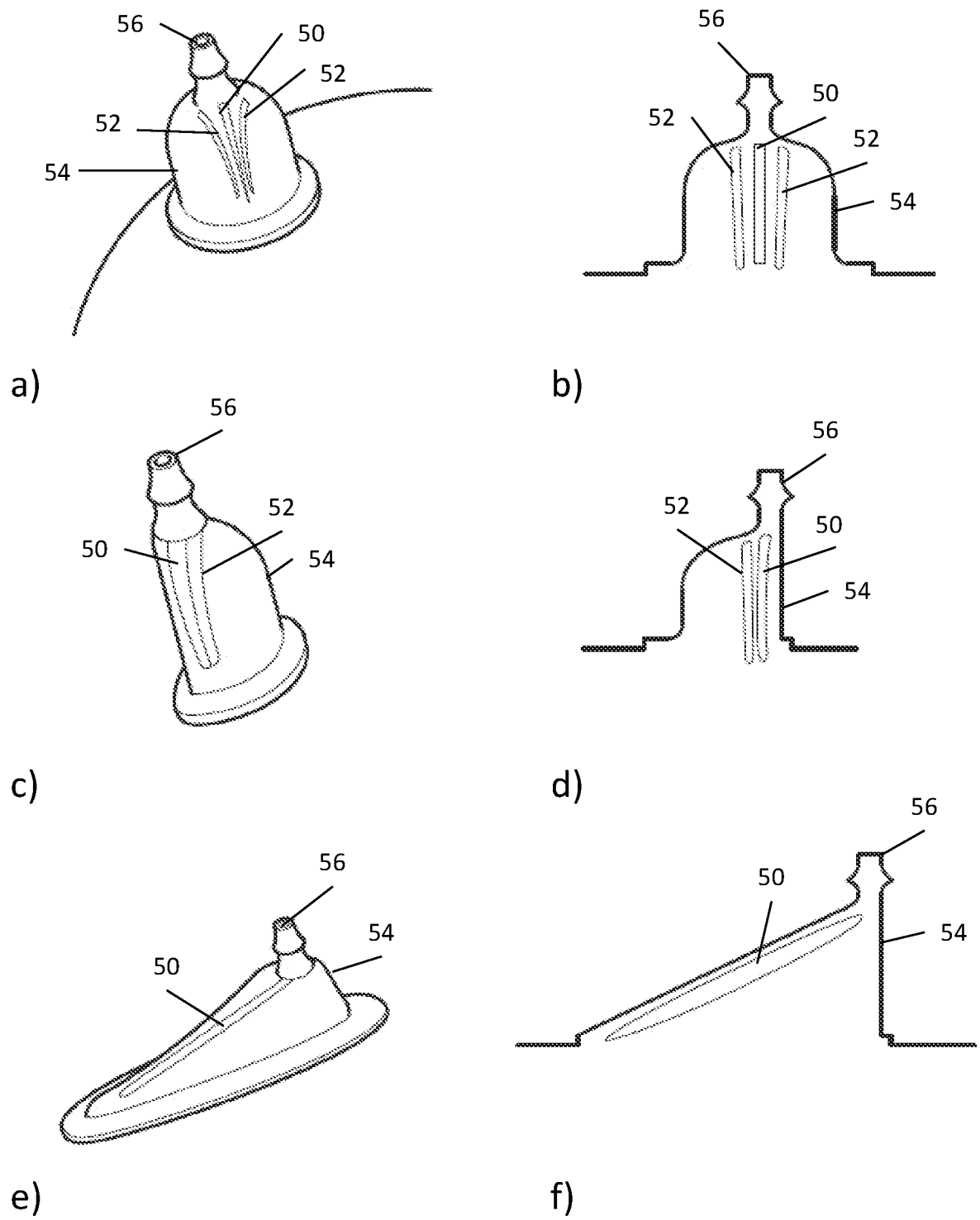
FIGS. 14-24 are various views of additional vent filter designs, according to other embodiments of the invention.
Figure 15:
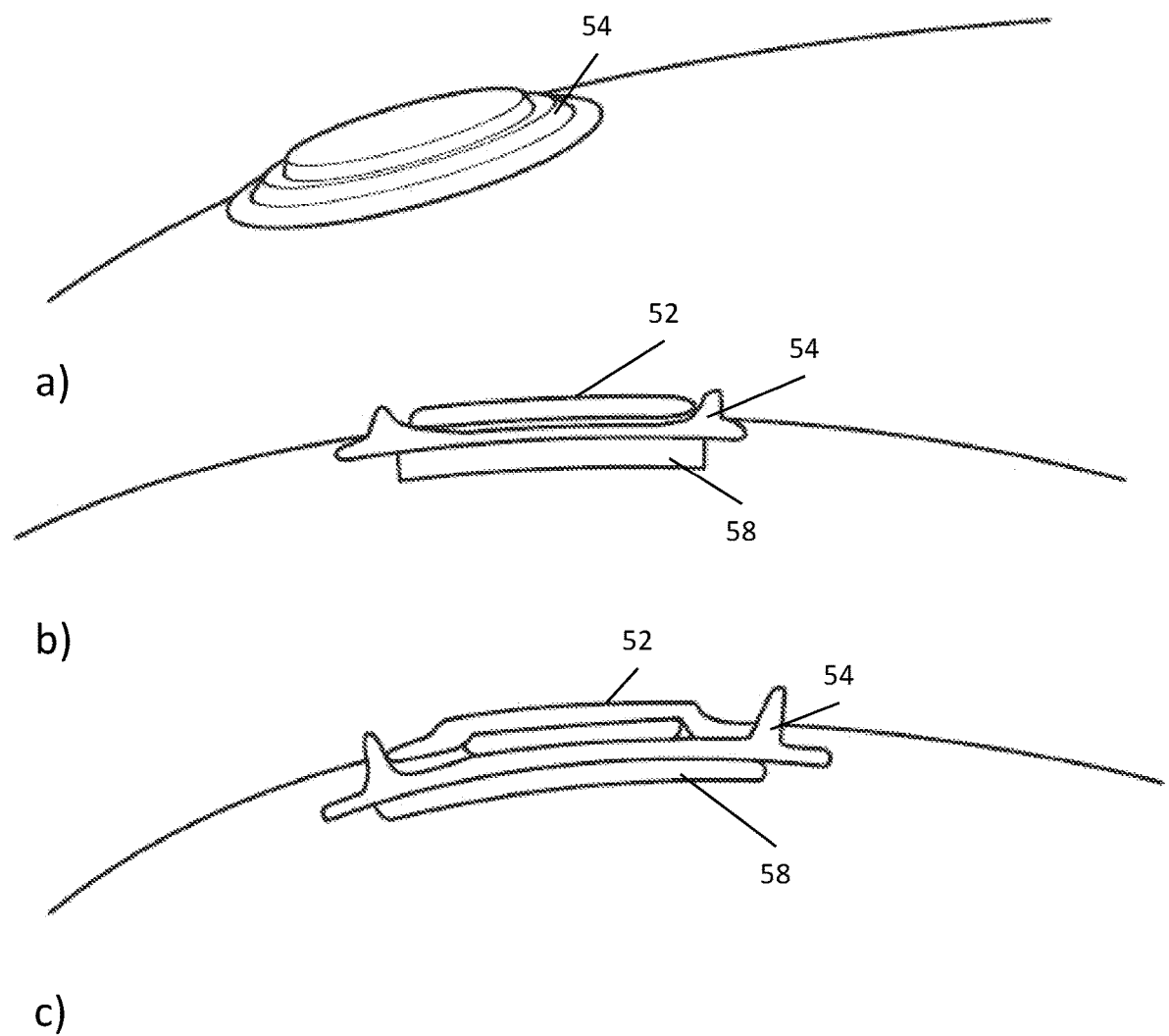
Figure 16:
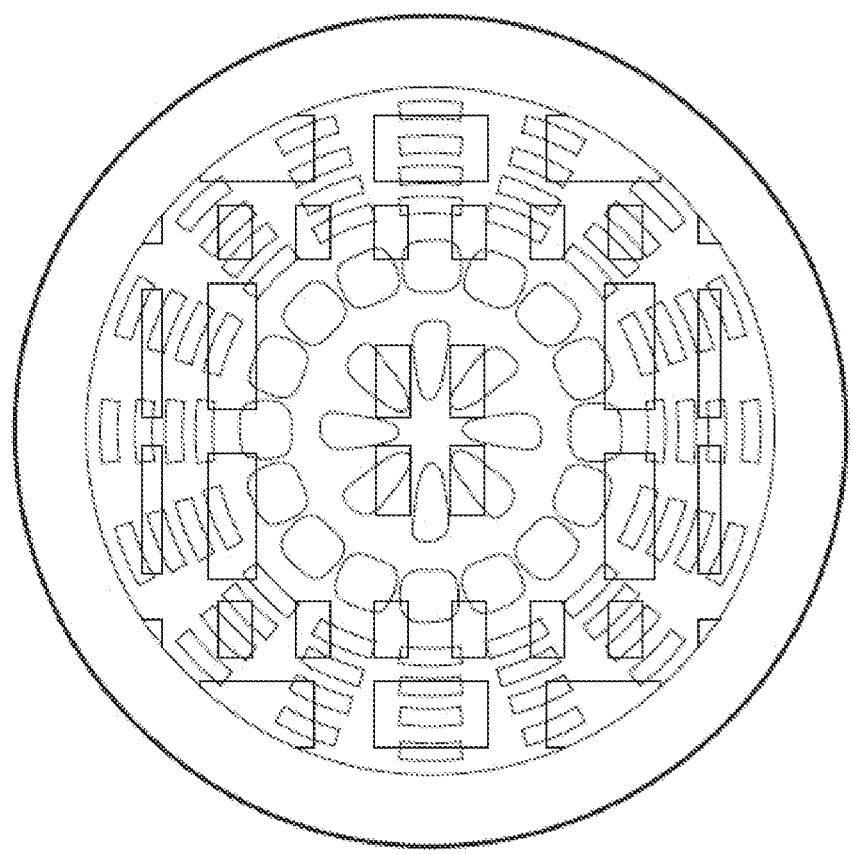
Figure 17:
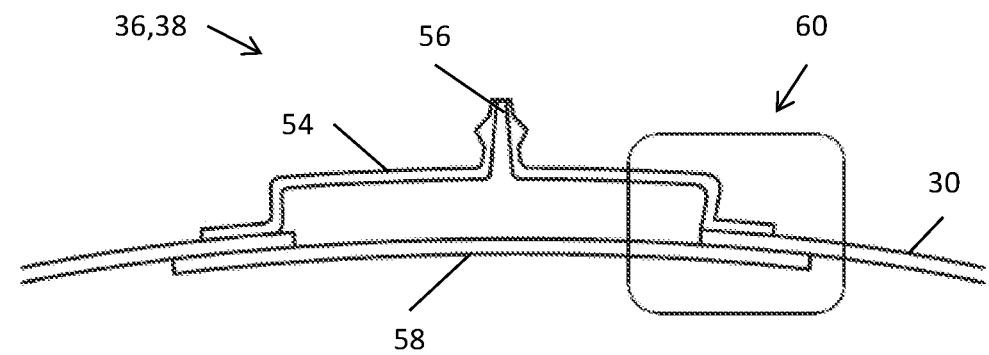
Figure 17:
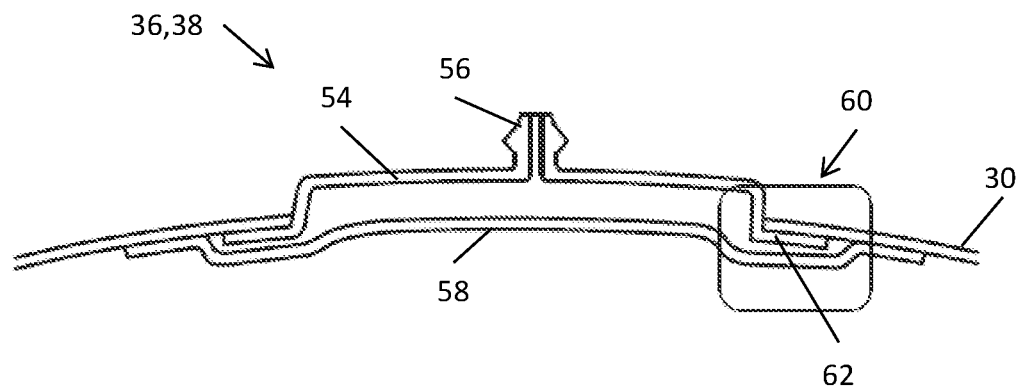
Figure 17:
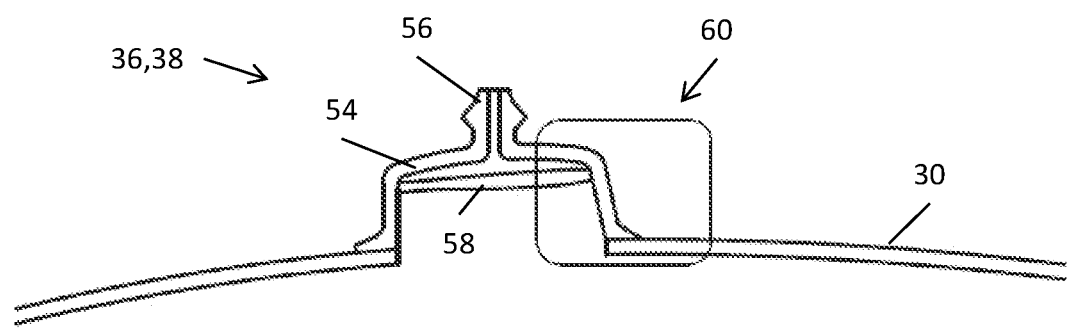

FIGS. 14-23 illustrate other possible configurations for the integrated vent filters 36, 38, according to yet other embodiments of the present invention. For example, FIG. 14 illustrates possible check valves incorporating a collector feature 50 and one or more valve members 52 in a housing 54 with a hose barb connector 56 for gas entry. FIG. 15 illustrates flush silicone check valves, having a filter membrane 58, a housing 54, and a silicone check valve membrane 52. FIG. 16 illustrates a vent filter having a membrane and a bored-in support area for reverse pressure control. FIG. 17 illustrates different orders of bonding 60 between the housing 54, filter membrane 58 and bag wall 30 to be used in the construction of the vent filter(s). As shown therein, a filter membrane 58 may be bonded to the inside of the bag 30, and the valve housing 54 may be bonded to the outside of the bag 30. In another embodiment, the filter membrane may be bonded to the inside of the bag, and the valve housing may have a flange 62 that is sandwiched between the inside of the bag and the membrane. In another embodiment, the valve may be bonded to the outside of the bag and the membrane may be positioned interior to, and attached to, the valve housing.

Figure 18:
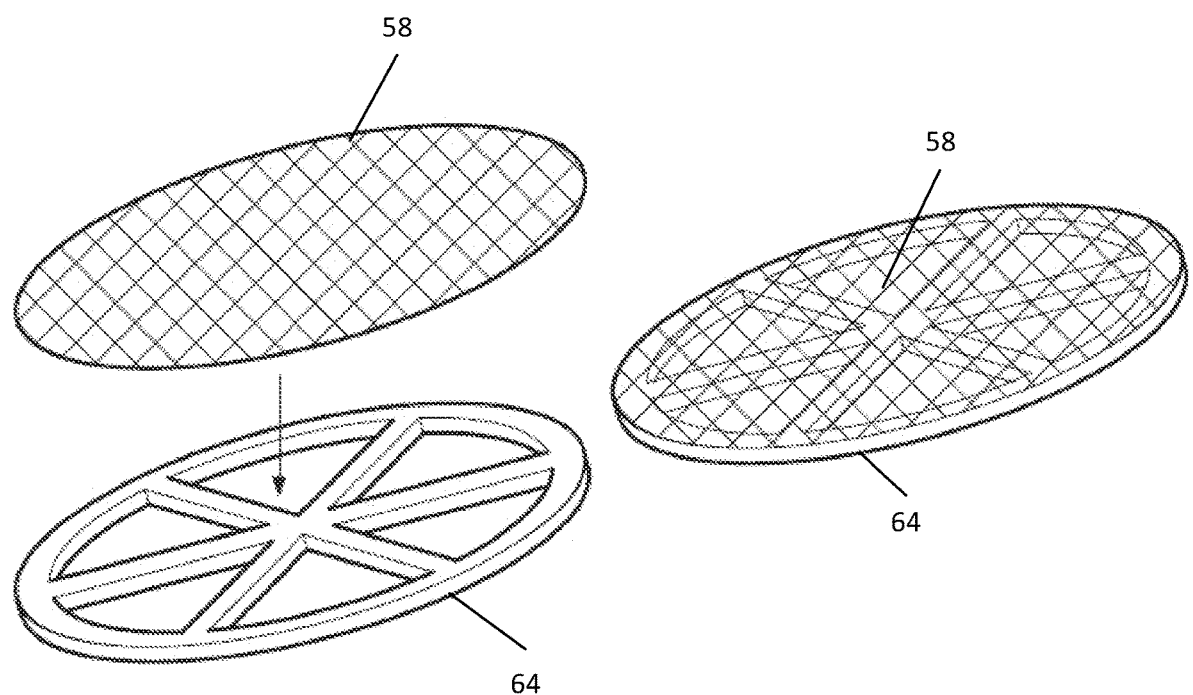

Referring to FIG. 18, in an embodiment the vent filters 36, 38 may have a skeletal structure 64 providing a base substrate for support, and a filter membrane 58 secured to the skeletal structure.

Figure 19:
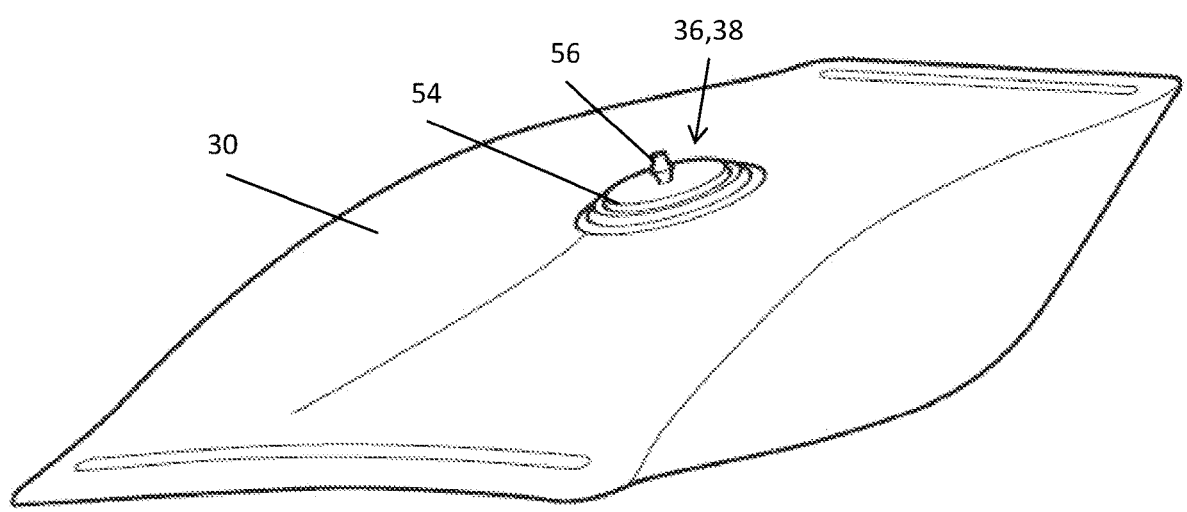

FIG. 19 is a perspective view illustrating the valve (i.e., vent filters 36, 38 with integrated check valve) bonded to the bioprocessing bag 30.

Figure 20:
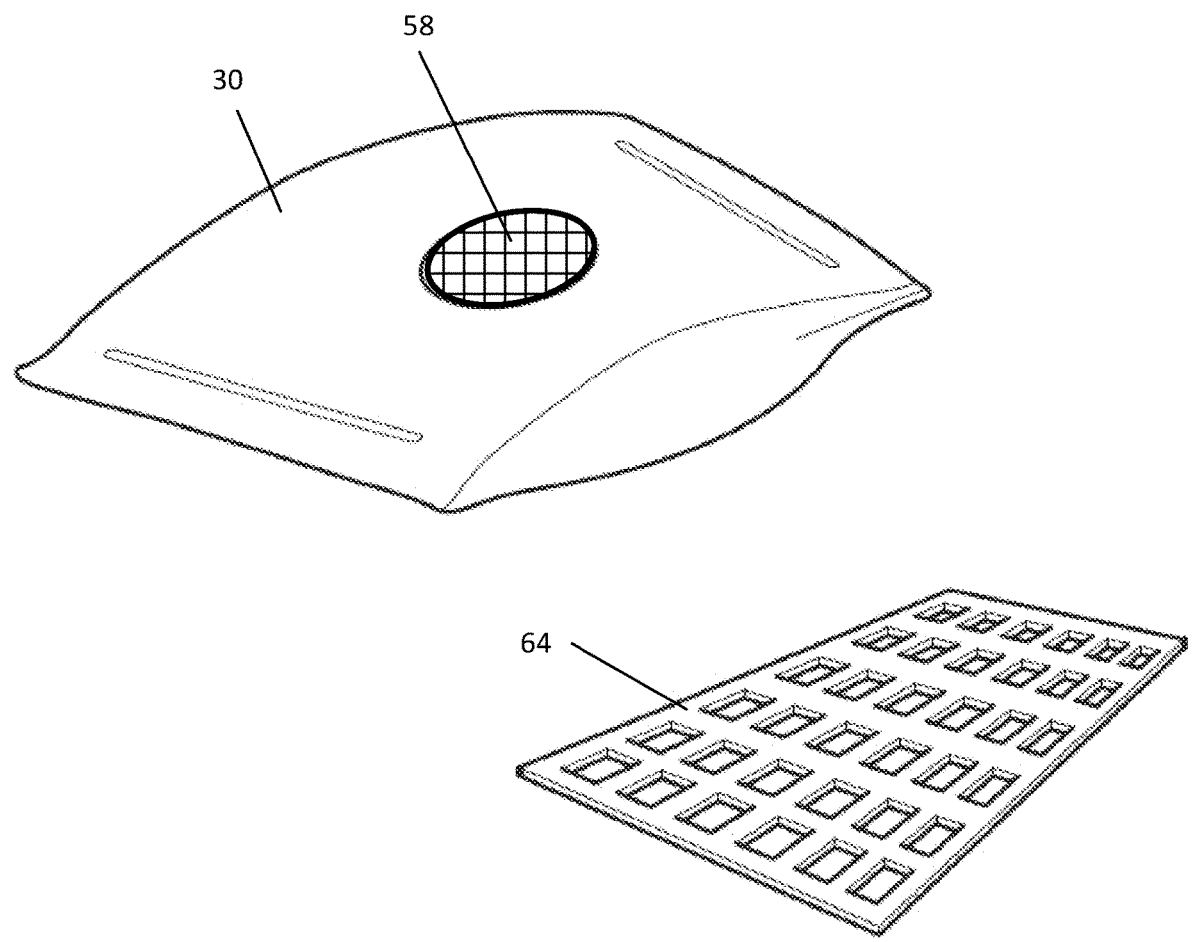

In an embodiment, as illustrated in FIG. 20, a superhydrophobic filter membrane 58 may be attached directly to the consumable bag 30. The filter membrane can also be supported by skeletal support structure 64.

Figure 21:
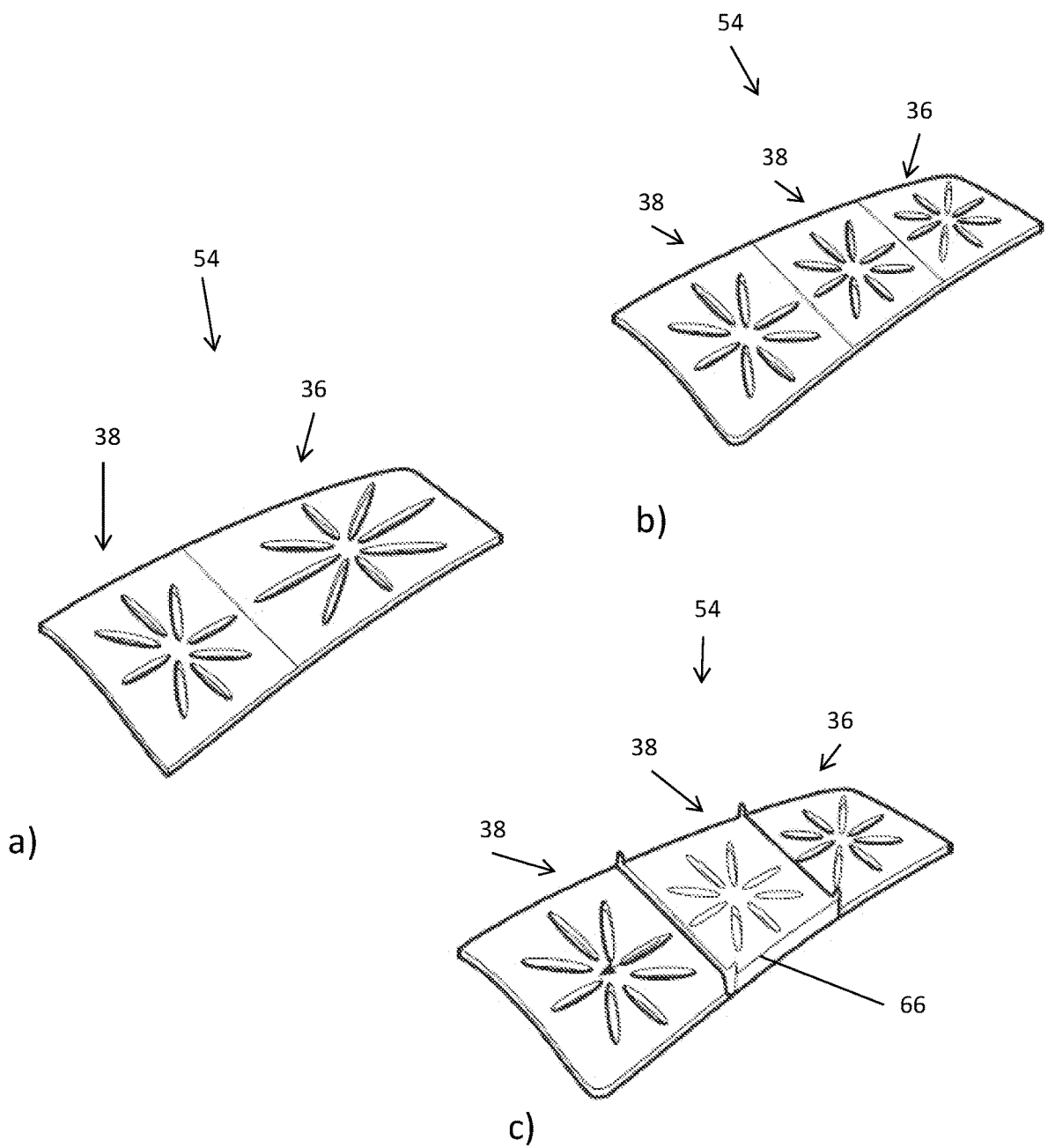
Figure 22:
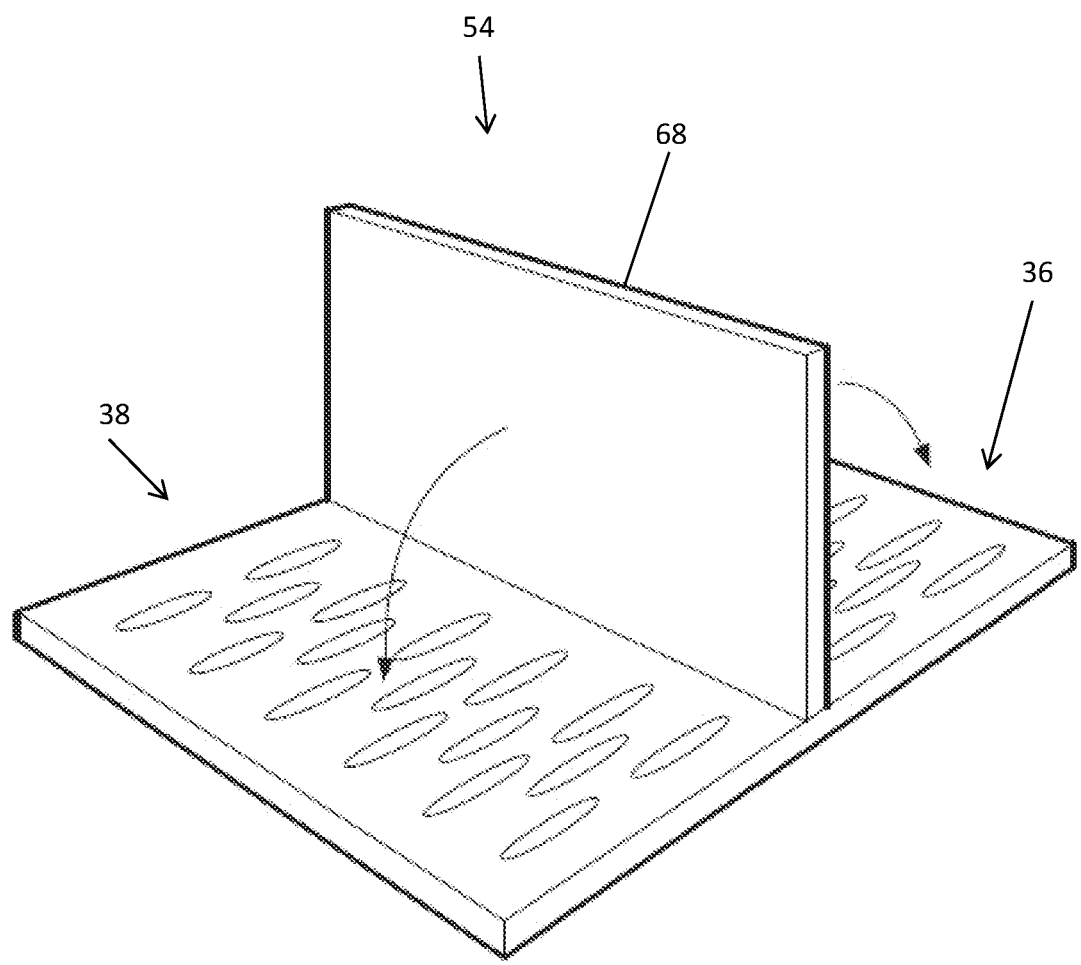

As shown in FIG. 21, in an embodiment, the inlet and outlet vent filters 36, 38 may be combined into a single housing 54, and the housing may include a sliding cover 66 that can be selectively opened or closed to allow fluid communication with the interior of the bag through an outlet filet or an inlet filter. FIG. 22 discloses a similar arrangement wherein the inlet 36 and the outlet 38 filters are integrated into a single housing 54, with a mechanism 68 to selectively switch between the two.

Figure 23:
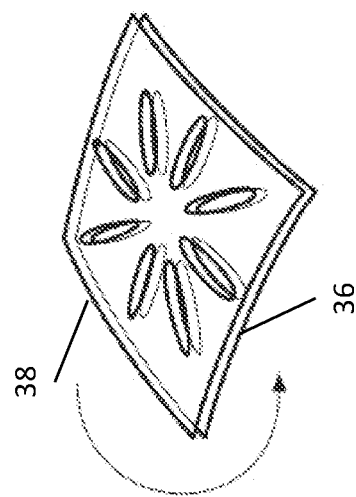
Figure 23:
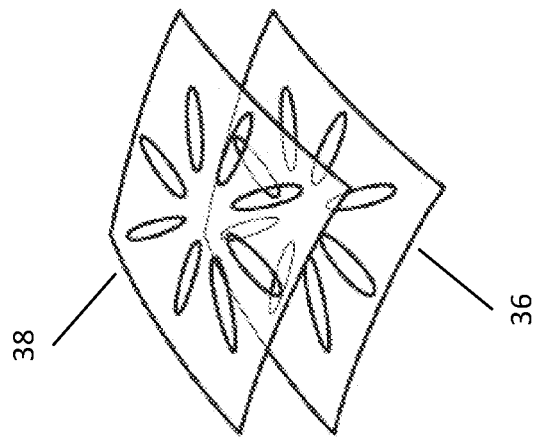
Figure 23:
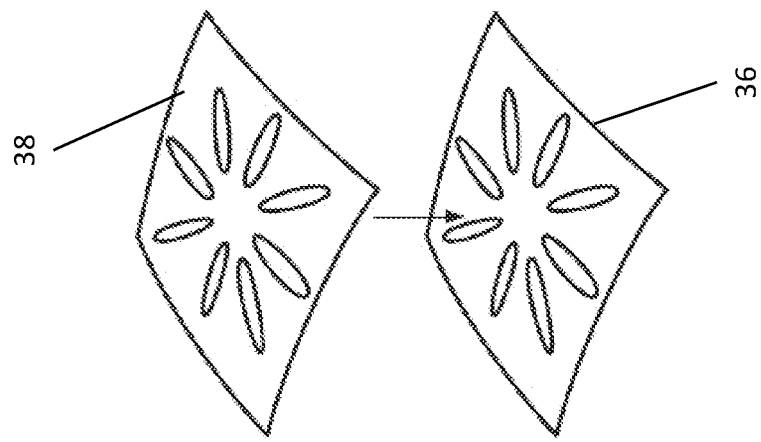

With reference to FIG. 23, in an embodiment, a configuration is shown where a filter cover may be rotatable to expose either the inlet filter 36 or an outlet filter 38.

Figure 24:
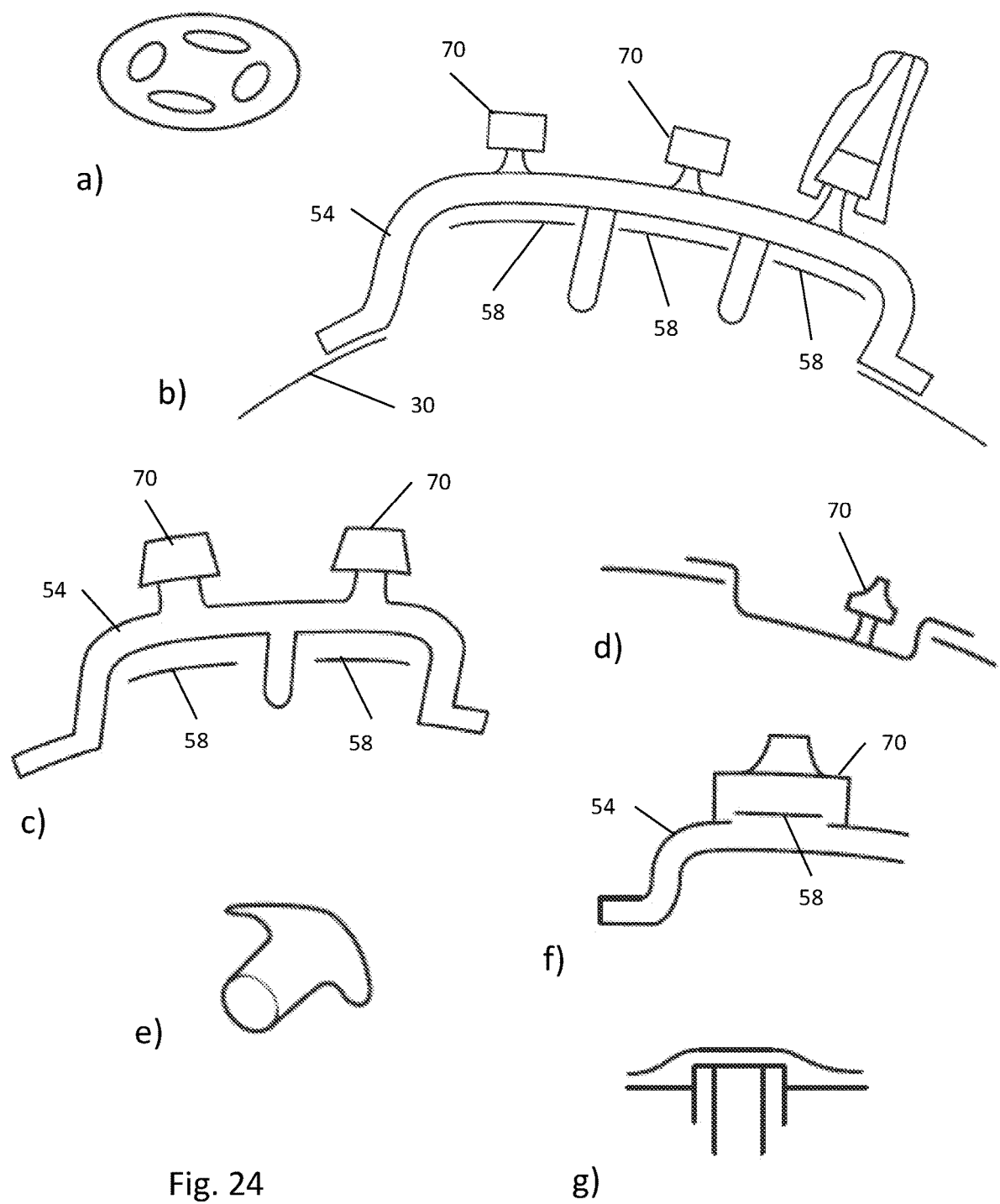

Finally, FIG. 24 illustrates multi-port filters (i.e., inlet and outlet) having a capping 70 option.

The filters described above present a number of cost saving opportunities, as well as containing fewer components than existing devices.

Figure 25:
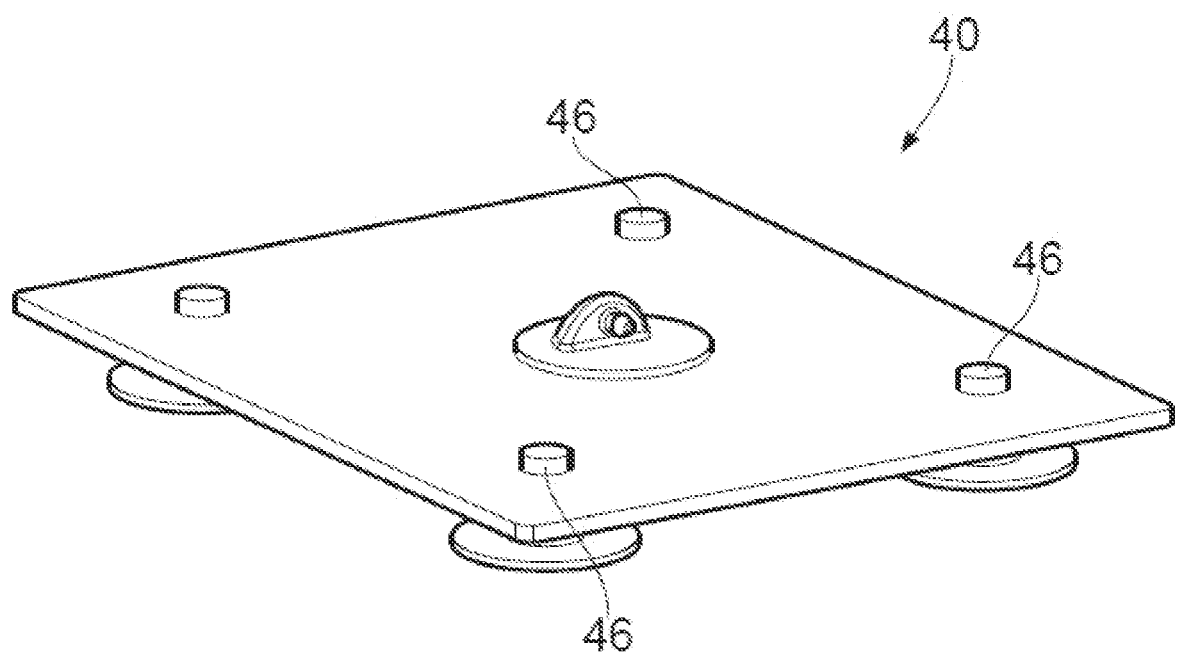
FIG. 25 is a perspective view of a perfusion filter of a bioprocessing bag of the bioreactor system of FIGS. 1-11.

Turning now to FIG. 25, a more detailed view of the perfusion filter 40 within the bioprocessing bag 30 is shown. In contrast to existing bags which typically have a free-floating perfusion filter, the perfusion filter 40 of the bioprocessing bag 20 is secured or tethered to an inside surface of the bag 30. The filter 40 is mounted on uprights 46 that space the surface of the filter 40 from the surface of the bag 30 to which it is attached. The filter 40 is therefore more robust than existing perfusion filters.

Figure 26:
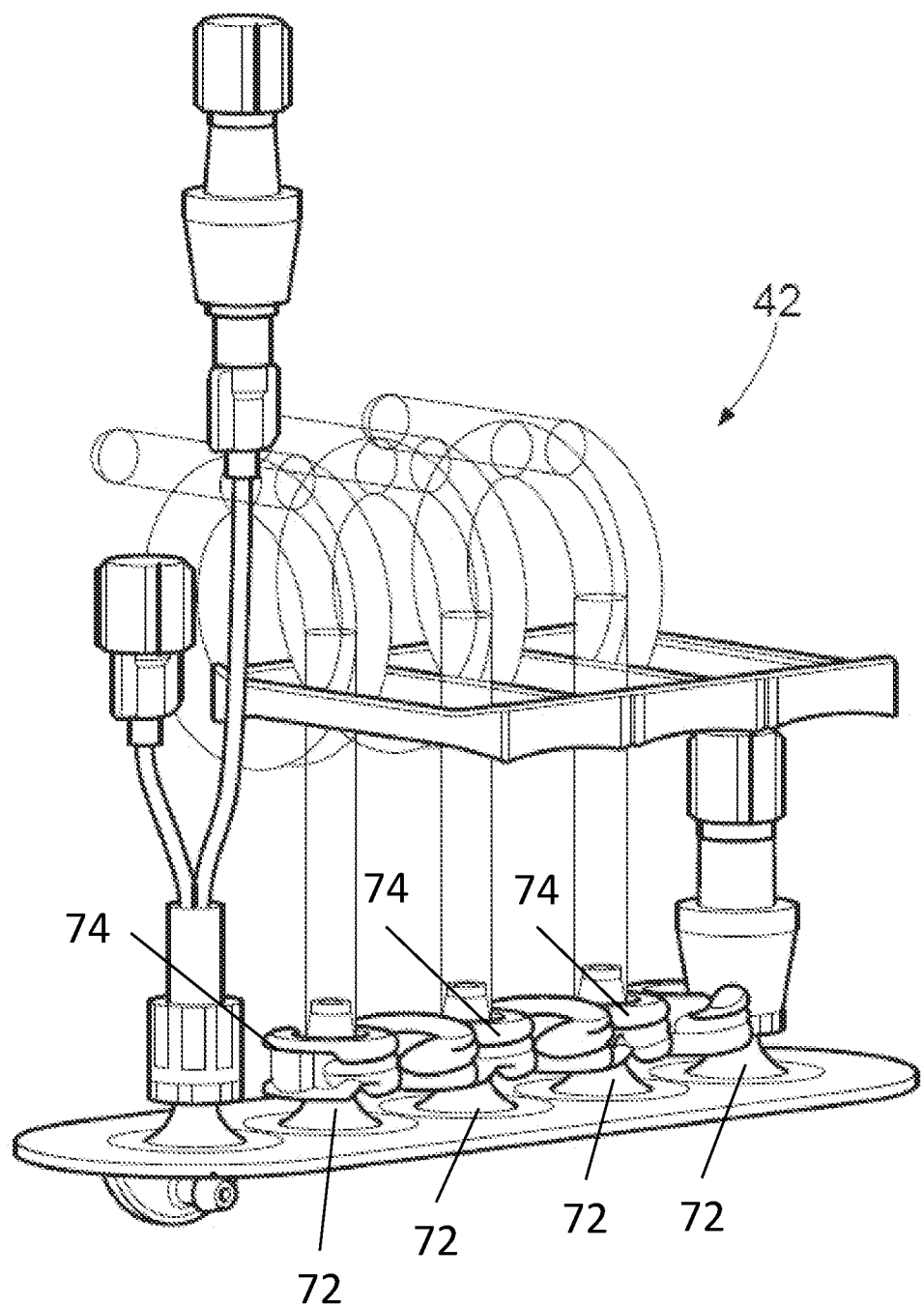
FIG. 26 is a tubing management device of the present invention.

Turning to FIG. 26, a more detailed view of the tubing management device 42 is shown. The device 42 is configured for integration with the bioprocessing bag 30 and includes a plurality of ports 72 for selective connection to inlet/outlet tubing, and a plurality of clamps 74 for receiving, retaining and organizing such tubing. The tubing management device 26 combines a plurality of ports 72 at a single location, which provides for better usability.

FIGS. 27-30 depict a bioreactor support plate 75 of the present invention. The plate is to facilitate adding drains 76, sensors 78 and such to bioreactor bags for a rocker like the WAVE product. Currently the trays don't have any good way to facilitate anything you want to come out the bottom like a drain or a sensor that needs to be on the bottom but has significant size. A drain or sensor sitting on the tray would be above the tray bottom surface that would make it difficult to drain or the sensor size would not be able to be at the bottom. Putting anything on the tray requires the bag to conform over it and could also cause damage to the bag as well as sticking too far up in the bag. If the sensor was inside the bag it would be well above the bottom and with low volume or rocking motion the sensor would be either above the liquid level and or end up above the liquid surface especially during rocking. Some sensors are preferred to operate below liquid level and a drain should be at the very bottom to facilitate draining completely and easily. This plate would support these items but also allow them to protrude well below the tray bottom surface, as currently only small drains/sensors are in or under the bag and on top of the tray. New sensors and drains are larger and this plate could accommodate these new and future components. The plate could have holes for drains or sensors and the plate would support those. If the sensors or drains and connectors below the bag are bigger than the sensor or drain port at the bag, the plate desirably includes a "U" shape channel in the plate which opens on a perimetrical edge of the plate. Such an open slot extending in from the perimetrical edge of the plate facilitates feeding the connector conduits through the opening in the tray while obviating the need to pass a connector or sensor through the opening in the plate. The slot design also allows the plate to still support the sensor and the bag once in place, both of which need support as the flexible bag with liquid in it would extrude through any significant opening.

This modular plate could be designed to support many different types of existing sensors, drains, etc. in the future. The present invention further contemplates sizing the plate to accommodate future devices that are added to the bottom of a bioreactor bag. Additionally, the plate need not be centrally-mounted about its pivot, but could be mounted off-center. Desirably, the plate is located so as to position the sensors in the center of the rocking motion to maximize the likelihood of always being under the liquid level during rocking. The end near the bottom would most likely would be used for the drain location. Alternatively, there could be more than one of these plates minimizing the area these require and better control the heating or cooling of the area the plate occupies. Existing trays have heat or cooling in a significant area of the tray to facilitate even and adequate temperature control.

Figure 27:
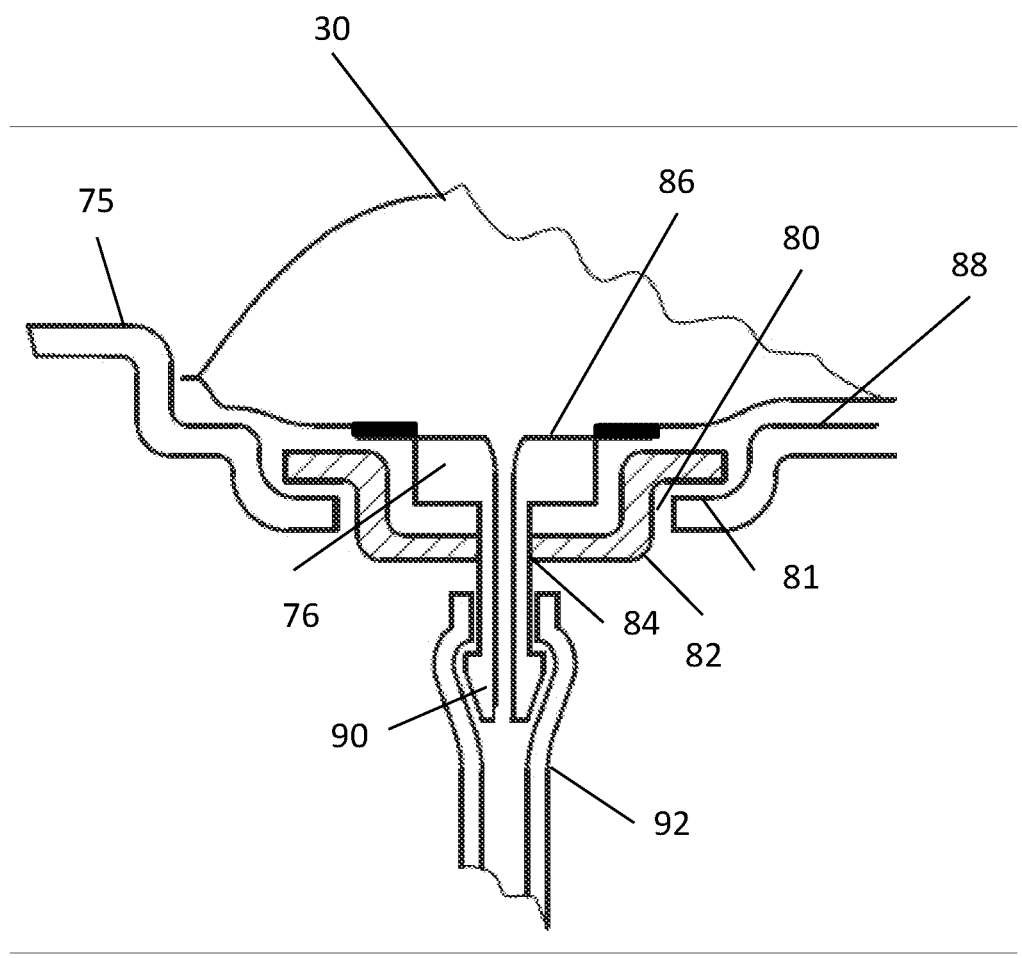
FIGS. 27-30 depict a bioreactor-support plate of the present invention.

FIG. 27 specifically shows a plate 75 of the invention with a drain port 76 attached to a bioreactor bag 30. The plate has a recessed opening 80, into which an insert 82 with one or more holes 84 is fitted, supported by the recessed edges (flange) 81 of opening 80. The drain port 76 is welded to the bottom wall of bag 30 and placed in one of the holes such that the upper end 86 of the port is flush with or slightly below the bag support area 88 of the plate. The drain port may comprise a hose barb connection 90 to which a length of tubing 92 is attached. As an alternative to placing the drain port in a hole, the drain port may be integral with the insert 82.

Figure 28:
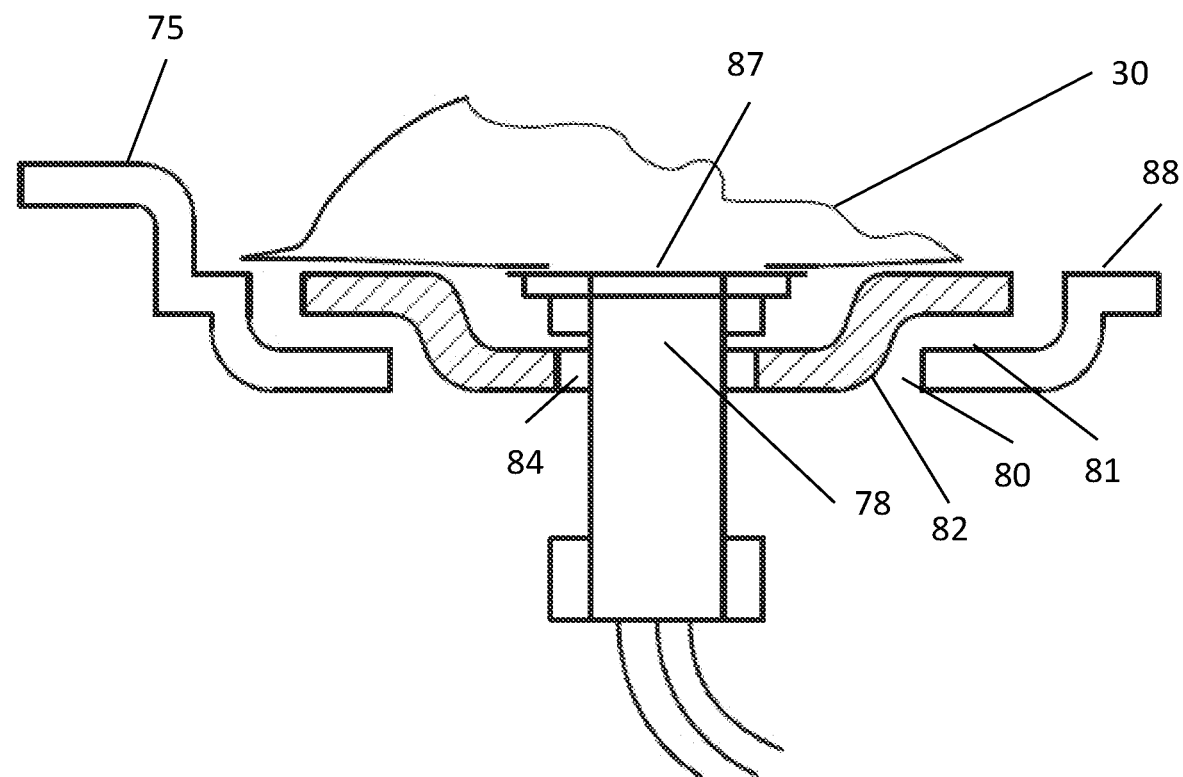

FIG. 28 shows the plate 75 of the invention with a sensor 78 attached to a bioreactor bag 30. Insert 82 with one or more holes 84 is supported by the recessed edges (flange) 81 of opening 80 and sensor 78 is placed in one of the holes, e.g. such that the upper end 87 of the sensor is flush with or slightly below the bag support area 88 of the plate. As an alternative to placing the sensor in a hole, the sensor may be integral with the insert 82.

Figure 29:
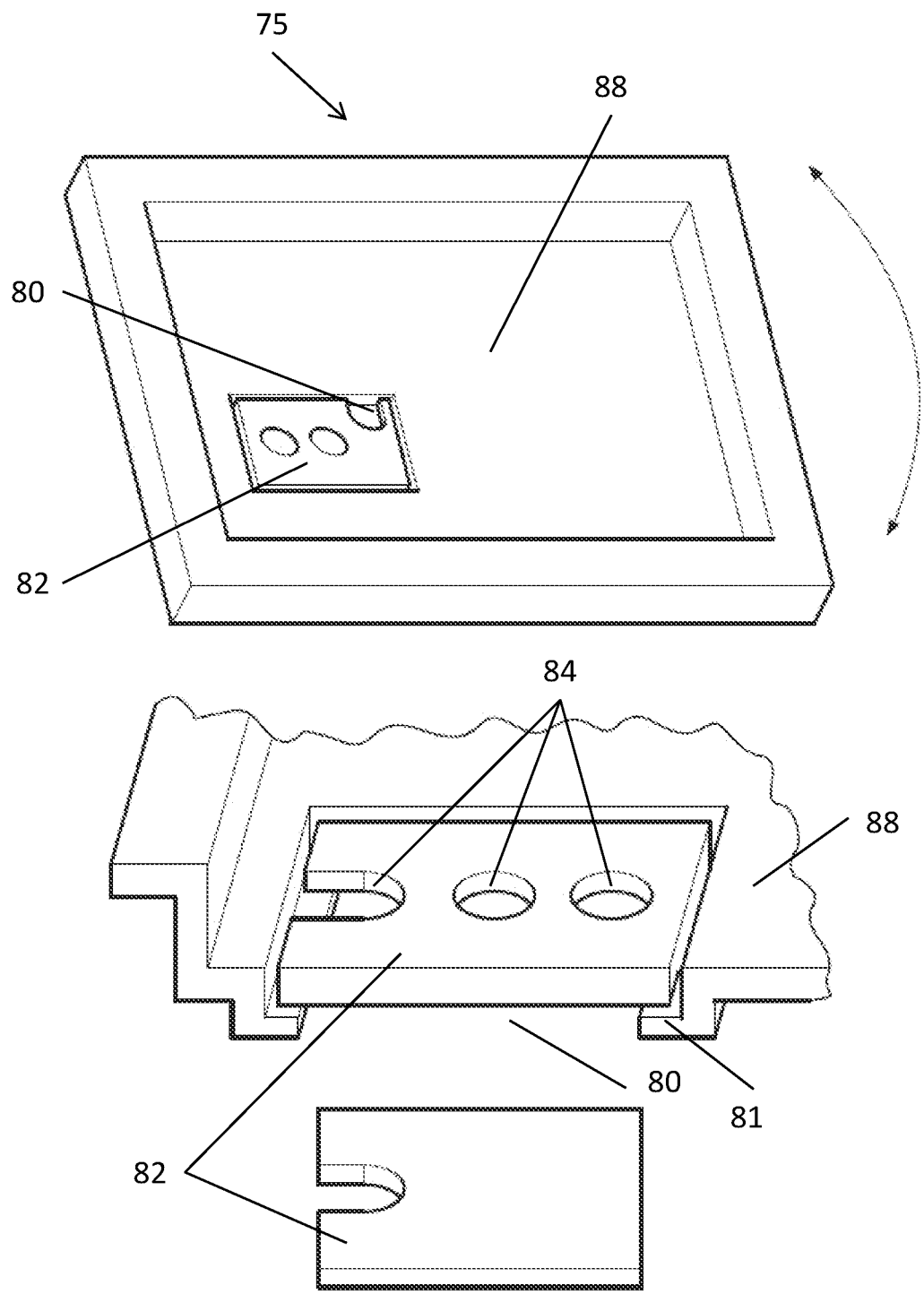

FIG. 29 shows an overview of plate 75, with recessed opening 80 and insert 82 placed in the opening.

Figure 30:
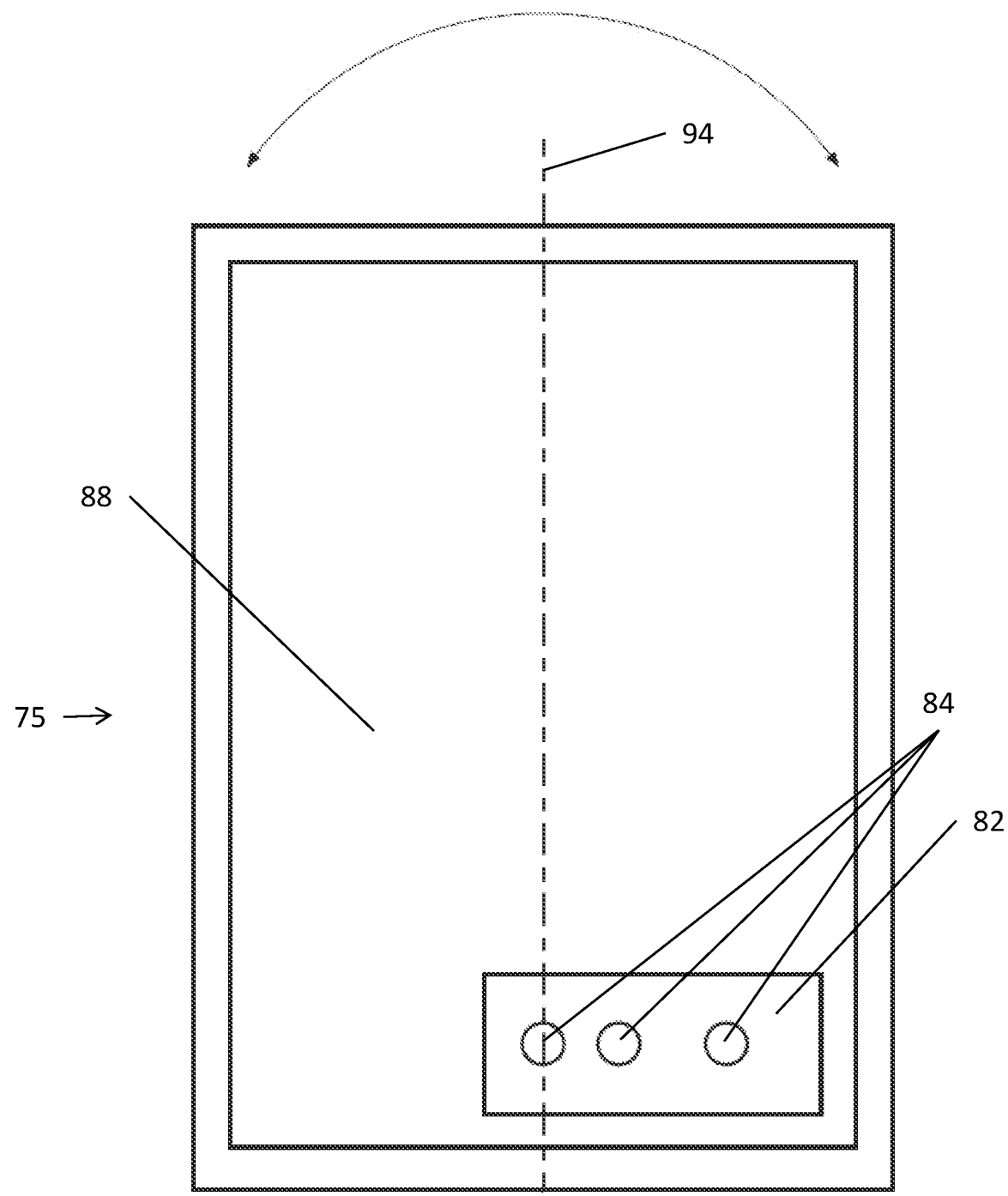

FIG. 30 shows a top view of plate 75 with insert 82 and an axis 94, around which the plate rocks.

In general terms, the insert 82 may comprise one or many of a load cell (for determining the weight of a bag), RFID module (e.g. for recognizing an RFID tag on a bag or for receiving a signal from an RFID sensor), temperature sensor, optical sensor (to be fitted adjacent to an optically transparent window on a bag), accelerometer, infrared sensor, dissolved air sensor, and components to enhance mixing (fins/blades, ultrasonics, etc). These devices may be integral with the insert or placed in holes of the insert.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. As used herein to describe the present invention, directional terms such as "up", "down", "upwards", "downwards", "upper", "lower", "top", "bottom", "vertical", "horizontal", "above", "below" as well as any other directional terms, refer to those directions in the appended drawings.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A bioreactor system, comprising:
a base platform;
a bioprocessing bag or a bioreactor bag;
a lid received atop the base platform and defining an interior space for receiving the bioprocessing bag or the bioreactor bag; and
a tubing array; and
a tubing management system supporting the tubing array a distance above the base platform, the tubing management system configured to provide a means for quickly connecting and disconnecting a fluid supply line,
wherein the tubing management system includes scaffolding directly connected to the base platform and supporting the tubing array above the base platform, wherein the bioprocessing bag or the bioreactor bag are positioned above the base platform.

2. The bioreactor system of claim 1, further comprising; an access door in the lid.

3. The bioreactor system of claim 2, wherein:
the scaffolding is in the form of a gantry.

4. The bioreactor system of claim 1, wherein:
the tubing management system connects the tubing array to an underside of the lid.

5. The bioreactor system of claim 1, wherein:
the bioprocessing bag or the bioreactor bag includes a vent filter having an integrated check valve.

6. The bioreactor system of claim 1, wherein:
the bioprocessing bag or the bioreactor bag includes a perfusion filter secured to an interior surface of the bioprocessing bag or the bioreactor bag and spaced from the interior surface.

7. The bioreactor system of claim 1, further comprising a bioreactor support plate comprising a bag support area and a recessed opening located in said bag support area, wherein an insert comprising one or more sensors, drain ports, RFID modules and mixing enhancement components is fitted in said recessed opening.

* * * * *